(12) United States Patent
Nagai et al.

(10) Patent No.: US 11,671,538 B2
(45) Date of Patent: Jun. 6, 2023

(54) OPERATION DEVICE AND DISPLAY CONTROL PROGRAM FOR DISPLAYING AN IMAGE AND A PLURALITY OF BUTTONS ON A DISPLAY

(71) Applicant: FUJIFILM Corporation, Tokyo (JP)

(72) Inventors: Toshiaki Nagai, Tokyo (JP); Tsuneo Sato, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/470,327

(22) Filed: Sep. 9, 2021

(65) Prior Publication Data

US 2021/0409553 A1 Dec. 30, 2021

Related U.S. Application Data

(63) Continuation of application No. PCT/JP2020/009131, filed on Mar. 4, 2020.

(30) Foreign Application Priority Data

Mar. 27, 2019 (JP) .............................. JP2019-060821

(51) Int. Cl.
*G06F 3/0482* (2013.01)
*G06F 3/04847* (2022.01)
(Continued)

(52) U.S. Cl.
CPC ....... *H04N 1/00167* (2013.01); *G06F 3/0482* (2013.01); *G06F 3/0485* (2013.01);
(Continued)

(58) Field of Classification Search
None
See application file for complete search history.

(56) References Cited

U.S. PATENT DOCUMENTS 6,999,113 B1 * 2/2006 Omura ................ H04N 1/3872
386/E5.072
2008/0250349 A1 * 10/2008 Peiro ..................... G06F 3/0482
715/810

(Continued)

FOREIGN PATENT DOCUMENTS

JP 2004-262092 A 9/2004
JP 2005-107963 A 4/2005
(Continued)

OTHER PUBLICATIONS

International Search Report issued in PCT/JP2020/009131; dated Mar. 31, 2020.
(Continued)

*Primary Examiner* — Henry Orr
(74) *Attorney, Agent, or Firm* — Studebaker & Brackett PC

(57) ABSTRACT

An image to be printed is displayed in an image display region EA1 set on a center line L passing through a center of a screen in a width direction. A print button PB for providing an instruction for printing of the image and an image editing menu buttons EB1 to EB3 are displayed in a button display region EA2 side by side along the width direction of the screen. The print button PB is disposed on the center line L and displayed in a larger size than other buttons EB1 to EB3. In a case in which the image editing menu button is touch-operated, a plurality of operation buttons for image editing are expanded and displayed in an operation region EA3 between the button display region EA2 and the image display region EA1. The operation buttons for image editing are displayed in a radial pattern on the same circumference around a point set on the center line L.

14 Claims, 30 Drawing Sheets

(51) Int. Cl.
*G06F 3/0485* (2022.01)
*G06F 3/04886* (2022.01)
*H04N 1/00* (2006.01)

(52) U.S. Cl.
CPC ...... *G06F 3/04847* (2013.01); *G06F 3/04886* (2013.01); *H04N 1/00188* (2013.01)

(56) References Cited

U.S. PATENT DOCUMENTS

| | | | | |
|---|---|---|---|---|
| 2009/0091772 | A1* | 4/2009 | Ujiie | H04N 1/00167 358/1.9 |
| 2009/0160792 | A1 | 6/2009 | Morohoshi et al. | |
| 2010/0281374 | A1* | 11/2010 | Schulz | H04M 1/72469 715/830 |
| 2012/0246566 | A1* | 9/2012 | Shiraga | G06F 3/1256 715/274 |
| 2013/0222307 | A1* | 8/2013 | Ozawa | G06F 3/041 345/173 |
| 2014/0325429 | A1 | 10/2014 | Chang | |
| 2015/0085317 | A1* | 3/2015 | Kim | G06F 3/1253 358/1.15 |
| 2015/0331595 | A1* | 11/2015 | Ubillos | G06F 3/04817 715/833 |
| 2017/0285921 | A1 | 10/2017 | Kusumoto | |
| 2017/0329511 | A1 | 11/2017 | Ueno et al. | |
| 2018/0007219 | A1* | 1/2018 | Oyama | H04N 1/00482 |
| 2019/0173814 | A1* | 6/2019 | McNeill | H04L 51/046 |

FOREIGN PATENT DOCUMENTS

| | | |
|---|---|---|
| JP | 2009-163278 A | 7/2009 |
| JP | 2012-203745 A | 10/2012 |
| JP | 2015-161992 A | 9/2015 |
| JP | 2016-115208 A | 6/2016 |
| JP | 2017-182632 A | 10/2017 |
| JP | 2018083971 | * 11/2018 |

OTHER PUBLICATIONS

International Preliminary Report On Patentability and Written Opinion issued in PCT/JP2020/009131; dated Sep. 28, 2021.
Yoneich Tsuchida, Impress Corporation, K. K., Digital Camera Magazine, vol. 13, No. 2, pp. 135-137, Jan. 20, 2012.
An Office Action; "Notice of Reasons for Refusal", mailed by the Japanese Patent Office dated Jul. 8, 2022, which corresponds to Japanese Patent Application No. 2021-508910 and is related to U.S. Appl. No. 17/470,327; with English language translation.
Blazingtek; "The best photo editing iphone app Photogene2"; YouTube Video; Mar. 25, 2014; URL: https://www.youtube.com/watch?v=N0ObZAg8CJQ; XP055903987, total 2 pages.
The extended European search report issued by the European Patent Office dated Apr. 7, 2022, which corresponds to European Patent Application No. 20778551.0-1224 and is related to U.S. Appl. No. 17/470,327.
An Office Action; "Notice of Reasons for Refusal", mailed by the Japanese Patent Office dated Dec. 27, 2022, which corresponds to Japanese Patent Application No. 2021-508910 and is related to U.S. Appl. No. 17/470,327; with English language translation.

* cited by examiner

OPERATION DEVICE AND DISPLAY CONTROL PROGRAM FOR DISPLAYING AN IMAGE AND A PLURALITY OF BUTTONS ON A DISPLAY

CROSS-REFERENCE TO RELATED APPLICATIONS

This application is a Continuation of PCT International Application No. PCT/JP2020/009131 filed on Mar. 4, 2020, which claims priority under 35 U.S.C § 119(a) to Japanese Patent Application No. 2019-060821 filed on Mar. 27, 2019. Each of the above application(s) is hereby expressly incorporated by reference, in its entirety, into the present application.

BACKGROUND OF THE INVENTION

1. Field of the Invention

The present invention relates to an operation device and a display control program, in particular, to an operation device and a display control program using a touch panel.

2. Description of the Related Art

In a portable terminal comprising a touch panel (for example, a smartphone, a tablet computer, and the like), a main operation is performed by the touch panel. Even in a case in which an image stored in the portable terminal is printed by a printer, the main operation is performed by the touch panel. For example, selection, processing, printing instruction, and the like of the image to be printed are all performed by the touch operation on the touch panel (see, for example, JP2017-182632A and the like).

SUMMARY OF THE INVENTION

However, the screen size of the touch panel provided in the portable terminal is small. Therefore, there is a limit to information that can be displayed. In particular, in a case in which the image is printed, it is necessary to display various buttons together with the image to be printed, but there is a limit to the number of buttons and the like that can be displayed on one screen. The number of displays can be increased by reducing the size of the button, but in a case in which the size of the button is reduced, there is a problem that operability and visibility are lowered. In addition, the information that can be displayed can be increased by sequentially switching the screen display in respond to the button operation, but in a case in which the screen display is switched, there is the disadvantage that the display is layered and it takes time to call the necessary functions.

The present invention has been made in view of such circumstances, and is to provide an operation device having good operability and a display control program.

(1) An operation device comprising a touch panel that detects a touch operation on a screen, and a display control unit that controls a display of the touch panel, in which the display control unit displays an image in an image display region set on a center line passing through a center of the screen in a width direction, displays a plurality of buttons including a print button for providing an instruction for printing of the image displayed in the image display region and an image editing menu button side by side along the width direction of the screen, displays the button positioned on the center line in a larger size than other buttons, in a case in which the image editing menu button is touch-operated, expands and displays a plurality of operation buttons for image editing in a region between a region in which the button is displayed and the image display region, and displays the plurality of operation buttons for image editing in a radial pattern around a point set on the center line.

(2) The operation device according to (1), in which the display control unit scrolls the plurality of operation buttons for image editing in response to a swipe operation or a flick operation on the region in which the plurality of operation buttons for image editing are displayed.

(3) The operation device according to (1) or (2), in which outer shapes of the plurality of operation buttons for image editing are similar to an outer shape of the image displayed in the image display region.

(4) An operation device comprising a touch panel that detects a touch operation on a screen, and a display control unit that controls a display of the touch panel, in which the display control unit displays an image in an image display region set on a center line passing through a center of the screen in a width direction, displays a plurality of buttons including a print button for providing an instruction for printing of the image displayed in the image display region and an image editing menu button side by side along the width direction of the screen, displays the button positioned on the center line in a larger size than other buttons, in a case in which the image editing menu button is touch-operated, displays a slide bar for image editing in a region between a region in which the button is displayed and the image display region, and displays the slide bar for image editing along a circle around a point set on the center line.

(5) The operation device according to any one of (1) to (4), in which the print button is disposed on the center line.

(6) The operation device according to any one of (1) to (5), in which the display control unit further displays a frame that surrounds the image displayed in the image display region and has the same margin as a printed article.

(7) The operation device according to (6), in which a printing instruction is received by a swipe operation or a flick operation on the image displayed in the image display region or the frame.

(8) The operation device according to any one of (1) to (7), in which in a case in which an instruction for printing of the image displayed in the image display region is provided, the display control unit moves the image displayed in the image display region along a direction orthogonal to the width direction of the screen to disappear from the screen.

(9) The operation device according to any one of (1) to (8), in which the display control unit displays a cancel button for providing an instruction for cancellation of printing while moving the image displayed in the image display region on the screen.

(10) The operation device according to any one of (1) to (9), further comprising a communication unit that communicates with a printer, and a transmission control unit that transmits, in a case in which an instruction for printing of the image displayed in the image display region is provided, image data to the printer via the communication unit.

(11) The operation device according to (10), in which the printer prints the image on an instant film.

(12) The operation device according to any one of (1) to (11), in which the touch panel has a rectangular-shaped screen, and a direction of a short side of the screen is the width direction.

(13) A display control program that causes a computer to realize a function of controlling a display of a touch panel that detects a touch operation on a screen, the function comprising displaying an image in an image display region set on a center line passing through a center of the screen in a width direction, displaying a plurality of buttons including a print button for providing an instruction for printing of the image displayed in the image display region and an image editing menu button side by side along the width direction of the screen, displaying the button positioned on the center line in a larger size than other buttons, expanding and displaying in a case in which the image editing menu button is touch-operated, a plurality of operation buttons for image editing in a region between a region in which the button is displayed and the image display region, and displaying the plurality of operation buttons for image editing in a radial pattern around a point set on the center line.

(14) A display control program that causes a computer to realize a function of controlling a display of a touch panel that detects a touch operation on a screen, the function comprising displaying an image in an image display region set on a center line passing through a center of the screen in a width direction, displaying a plurality of buttons including a print button for providing an instruction for printing of the image displayed in the image display region and an image editing menu button side by side along the width direction of the screen, displaying the button positioned on the center line in a larger size than other buttons, displaying, in a case in which the image editing menu button is touch-operated, a slide bar for image editing in a region between a region in which the button is displayed and the image display region, and displaying the slide bar for image editing along a circle around a point set on the center line.

According to the present invention, an operation device having good operability can be provided.

DESCRIPTION OF THE PREFERRED EMBODIMENTS

Preferred embodiments of the present invention will be described below in detail with reference to the accompanying drawings.

[Print System]

Here, as an example, a case will be described in which the present invention is applied to a system that wirelessly transmits an image from a portable terminal to a printer to print the image. In this case, the portable terminal functions as an operation device of the printer.

Figure 1:
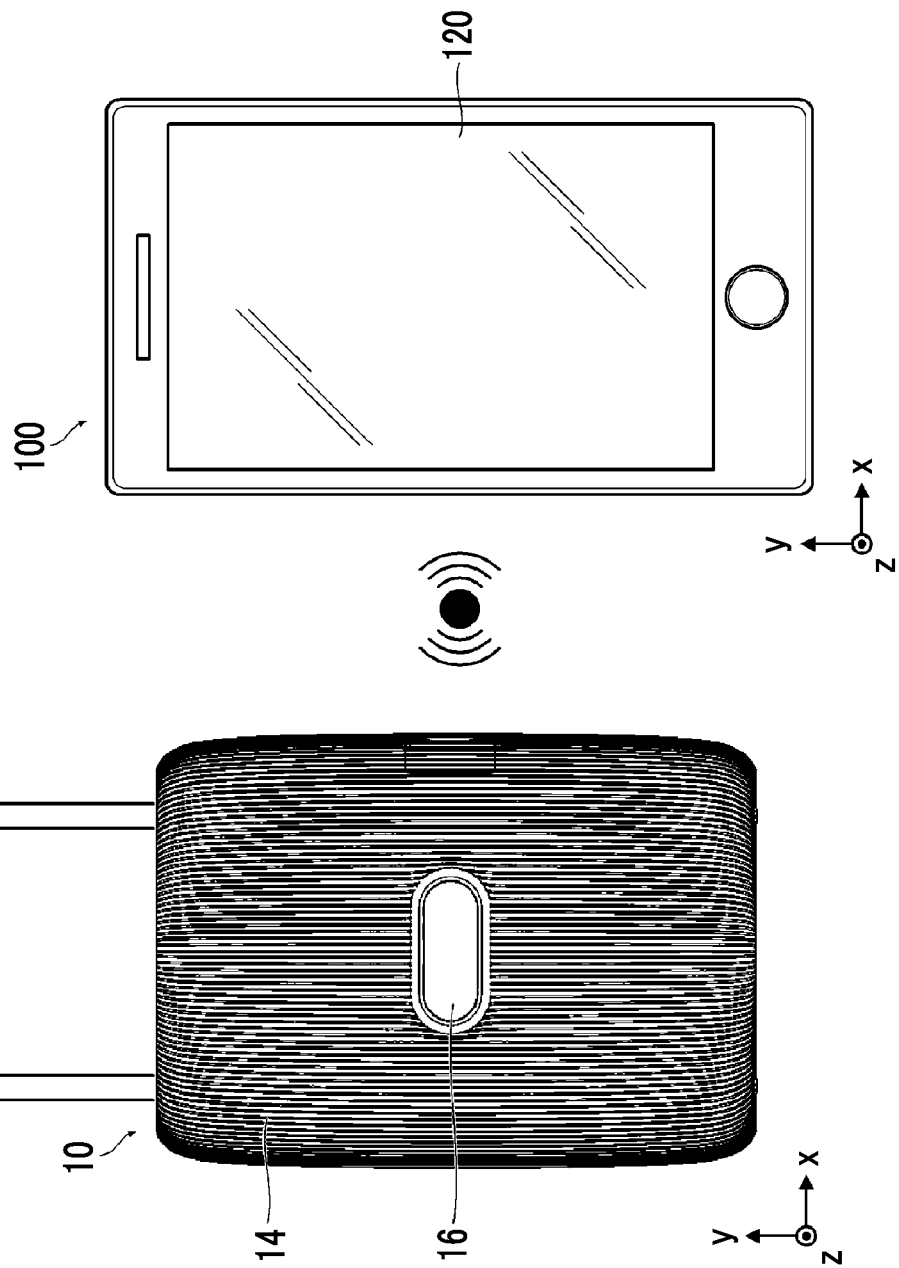
FIG. 1 is a diagram showing an example of a system configuration of a print system of the present embodiment.

FIG. 1 is a diagram showing an example of a system configuration of a print system of the present embodiment.

As shown in FIG. 1, the print system of the present embodiment includes a printer 10 and a portable terminal 100 that operates the printer 10.

The printer 10 is configured by a portable mobile printer. Further, the printer 10 is configured by an instant printer that prints the image on an instant film 12. For the instant film 12, a sheet film method (also referred to as a monosheet type) is used.

The portable terminal 100 is configured by a mobile computer (for example, a smartphone, a personal data assistance (PDA), a tablet, or the like) comprising a touch panel. In the following, as an example, a case will be described in which the portable terminal 100 is configured by a smartphone.

The printer 10 and the portable terminal (smartphone) 100 are wirelessly connected to each other. Communication between the printer 10 and the portable terminal 100 is performed by, for example, short range wireless communication such as Bluetooth (registered trademark) or wireless fidelity (WiFi).

[External Configuration of Printer]

Figure 2:
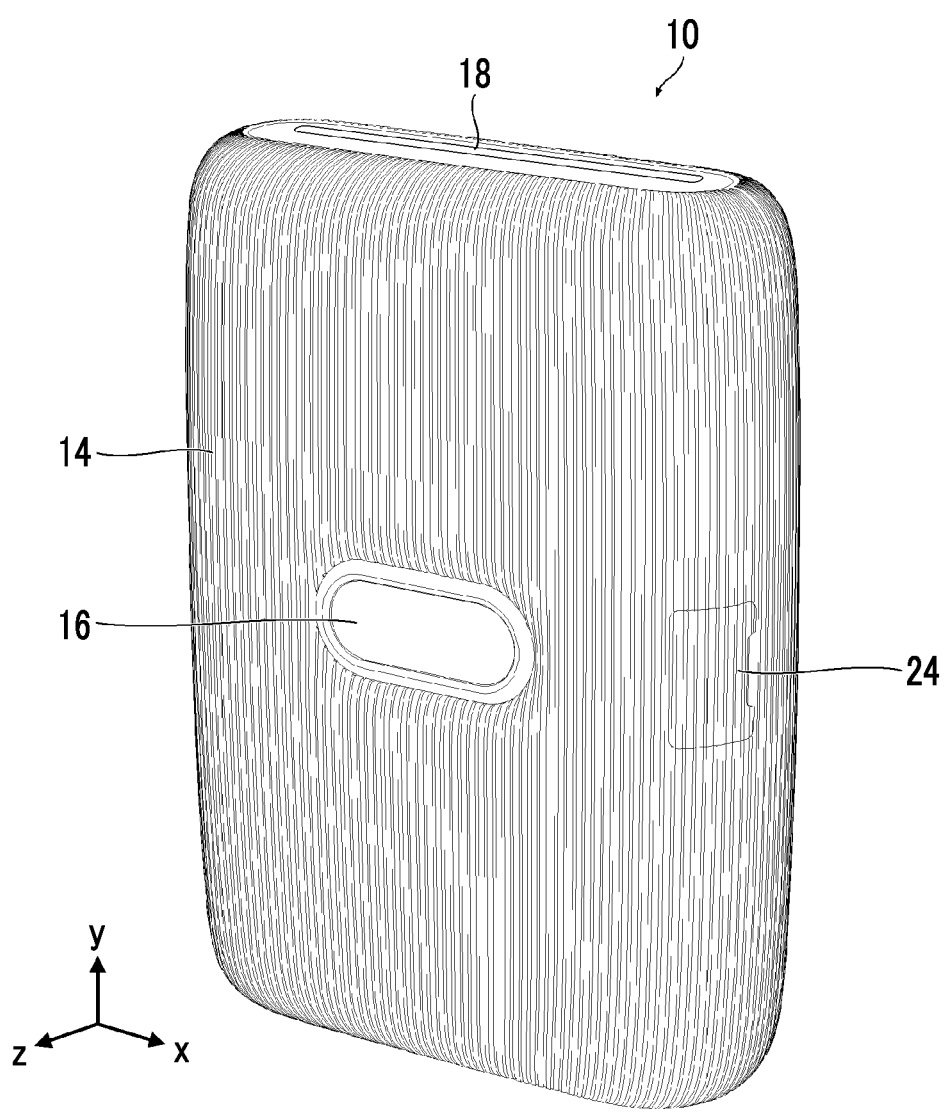
FIG. 2 is a front perspective view showing an example of an external configuration of a printer.
Figure 3:
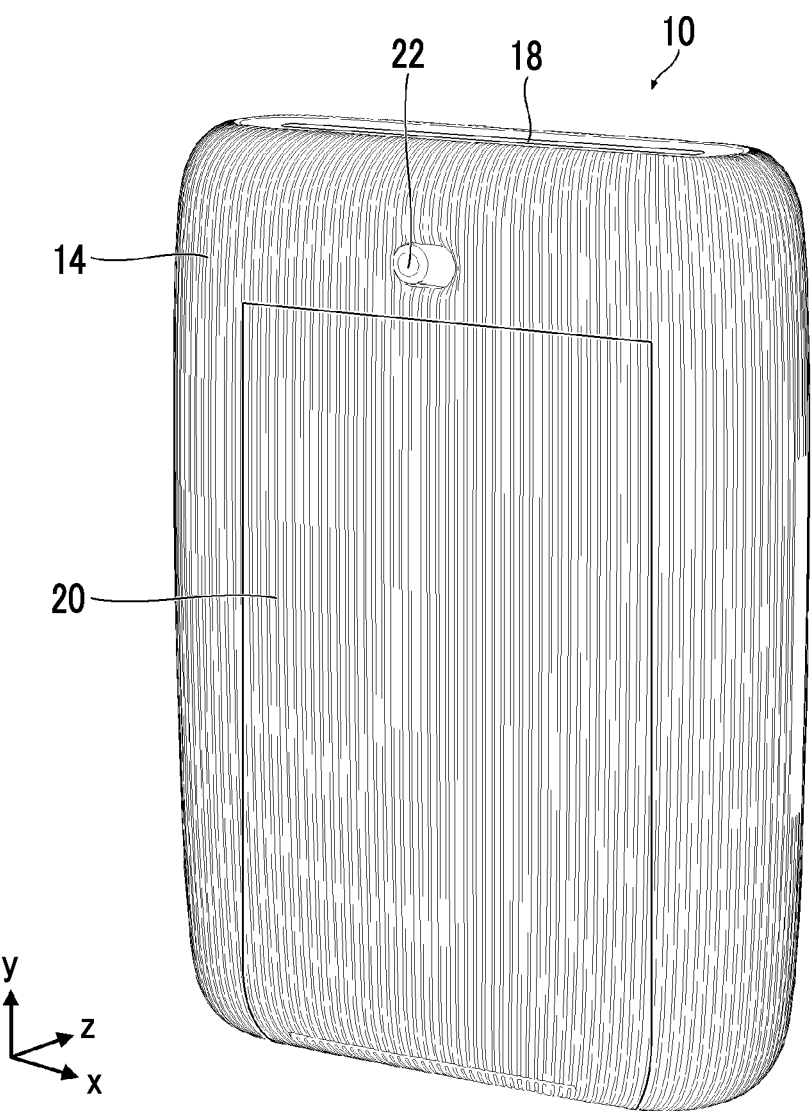
FIG. 3 is a rear perspective view of the printer shown in FIG. 2.

FIG. 2 is a front perspective view showing an example of an external configuration of the printer. FIG. 3 is a rear perspective view of the printer shown in FIG. 2.

As described above, the printer 10 is configured by the instant printer. The instant film 12 is loaded in the printer 10 in the state of a film pack (see FIG. 5) in which a plurality of films are accommodated in a case.

A printer body 14 has a rounded flat rectangular box shape, and is configured to be portable by being held by one hand. Also, the printer body 14 is configured to be vertically placed (placed upright on a flat place) and horizontally placed (laid down on a flat place). FIGS. 1 and 2 show a case in which the printer 10 is vertically placed.

The printer 10 comprises a push-type power button 16 on the front side thereof at a substantially center position. The power of the printer 10 is turned on and off by long pressing the power button 16 (an operation of maintaining long press for a certain period of time or longer). The power button 16 also serves as a light emitting unit, and emits light by causing a light source unit provided inside the power button 16 to emit the light.

The printer 10 (the upper portion in a case of being vertically placed) comprises a discharge port 18 on the upper portion thereof. The printed instant film 12 is discharged from the discharge port 18.

The printer 10 comprises a film pack lid 20 that opens and closes a film pack loading chamber (see FIG. 4) on the rear side thereof. Further, the printer 10 comprises a lock release lever 22 that releases the lock of the film pack lid 20. In a case in which the lock is released by the lock release lever 22 and the film pack lid 20 is opened, the film pack loading chamber is opened. In a case in which the film pack lid 20 is closed after loading the instant film pack, the film pack lid 20 is locked by a lock mechanism (not shown), and the film pack is sealed in a light-shielded state.

The printer 10 comprises a USB (universal serial bus) cable connected part cover 24 that opens and closes a USB cable connected part (not shown) on the one side portion thereof. In the printer 10, a built-in battery is charged via the USB cable connected part exposed by opening the USB cable connected part cover 24.

[Configuration of Print Unit of Printer]

Figure 4:
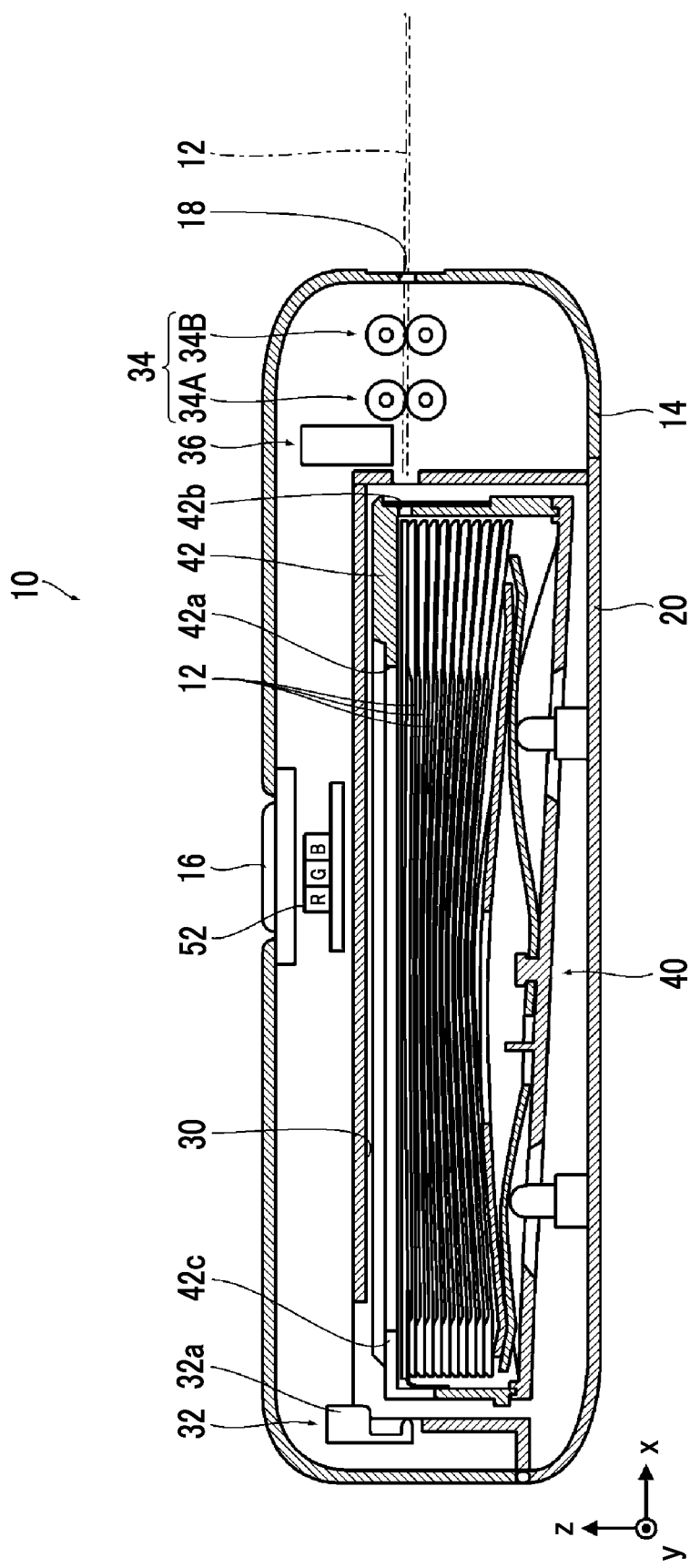
FIG. 4 is a cross-sectional view showing a schematic configuration of a print unit of the printer.

FIG. 4 is a cross-sectional view showing a schematic configuration of a print unit of the printer. FIG. 4 shows a state in which the printer is horizontally placed.

As shown in FIG. 4, the printer body 14 comprises, inside thereof, a film pack loading chamber 30, a film feeding mechanism 32 that feeds the instant film 12 from the film pack loaded in the film pack loading chamber 30, a film transport mechanism 34 that transports the instant film 12 fed from the film pack, and a print head 36 that records the image on the instant film 12. The film feeding mechanism 32, the film transport mechanism 34, and the print head 36 configure the print unit of the printer 10.

The film pack loading chamber 30 is configured as a recess portion into which a film pack 40 fits, and is opened and closed by the film pack lid 20.

Figure 5:
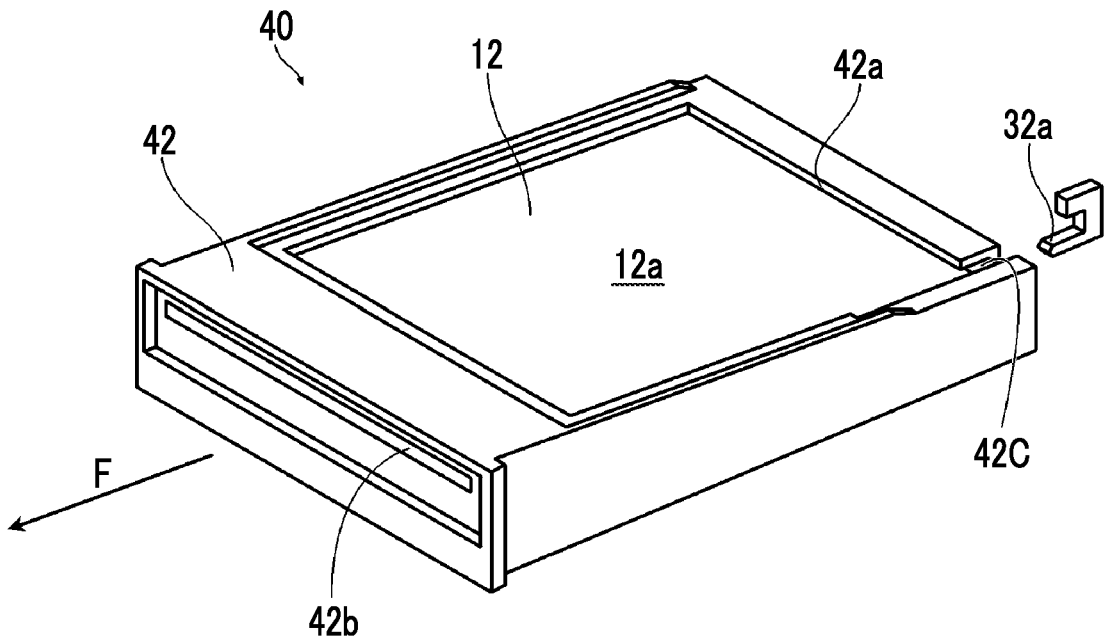
FIG. 5 is a perspective view of a film pack.
Figure 6:
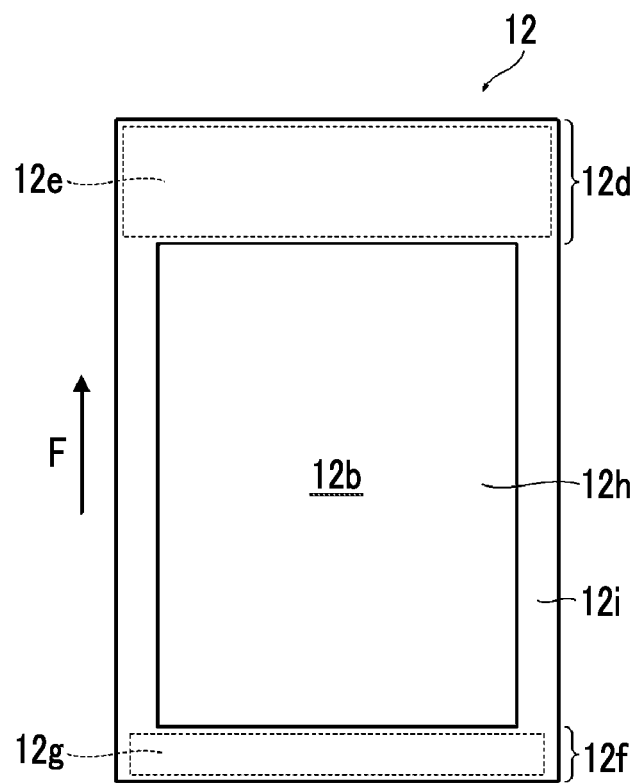
FIG. 6 is a front view of an instant film.
Figure 7:
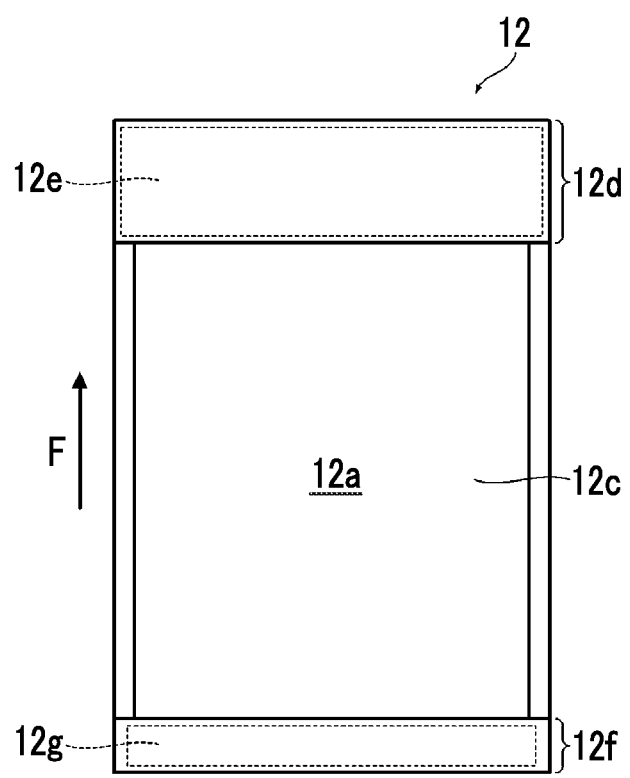
FIG. 7 is a rear view of the instant film.

FIG. 5 is a perspective view of the film pack. In addition, FIG. 6 is a front view of the instant film, and FIG. 7 is a rear view of the instant film. In FIGS. 5 to 7, a direction indicated by an arrow F is a feeding direction of the instant film 12. The instant film 12 is fed in the direction indicated by the arrow F and discharged from a case 42.

The instant film 12 has a rectangular card shape. The instant film 12 is configured such that one surface thereof is an exposure surface (a surface on which the image is recorded by exposure) 12a and the other surface thereof is an observation surface (a surface on which the recorded image is observed) 12b.

As shown in FIG. 7, the exposure surface 12a of the instant film 12 comprises an exposure region 12c, a pod portion 12d, and a trap portion 12f. The exposure region 12c is a region in which the image is recorded by exposure. The exposure region 12c is a printable region of the instant film 12. The pod portion 12d and the trap portion 12f are disposed on the front and rear sides in a feeding direction F with the exposure region 12c interposed therebetween. The pod portion 12d is disposed on the front side in the feeding direction F with respect to the exposure region 12c. A development treatment liquid pod 12e encompassing a development treatment liquid is built in the pod portion 12d. The trap portion 12f is disposed on the rear side of the feeding direction F with respect to the exposure region 12c. An absorbing material 12g is built in the trap portion 12f.

As shown in FIG. 6, the observation surface 12b of the instant film 12 comprises an observation region 12h. The observation region 12h is a region in which the image is displayed. By performing a development treatment on the exposure region 12c, the image is displayed in the observation region 12h. The observation region 12h is disposed corresponding to the exposure region 12c. A frame 12i is provided around the observation region 12h. Therefore, the image is displayed within the frame. Further, the observation region 12h is set slightly narrower than the exposure region 12c (set to be one size smaller). Therefore, in a case in which the image is recorded over the entire exposure region 12c, the image of which the periphery is trimmed is printed.

The instant film 12 is viewed in a direction in which the trap portion 12f faces up and the pod portion 12d faces down. Therefore, the image is printed in a direction in which the trap portion 12f faces up and the pod portion 12d faces down.

After exposure, the instant film 12 is subjected to the development treatment by spreading the development treatment liquid of the pod portion 12d in the exposure region 12c. The development treatment liquid of the pod portion 12d is squeezed out from the pod portion 12d by passing the instant film 12 between a spreading roller pair 34B, and is spread in the exposure region 12c. The development treatment liquid left over at the time of the spreading processing is trapped by the trap portion 12f.

The case 42 has a rectangular box shape. The case 42 has a rectangular opening 42a for exposure in the front portion. Further, the case 42 has a slit-shaped film discharge port 42b on the top portion. The instant films 12 are stacked and accommodated in the case in a state in which the exposure surface 12a thereof faces the front side (side of opening 42a for exposure) of the case 42 and the pod portion 12d faces the top side (side of film discharge port 42b) of the case 42. Also, the case 42 has a slit-shaped claw opening portion 42c on the bottom portion. The instant film 12 accommodated in the case 42 is fed one by one toward the film discharge port 42b by allowing a claw 32a to enter through the claw opening portion 42c, and is discharged from the film discharge port 42b.

A plurality (for example, 10) of the instant films 12 are stacked and accommodated in one film pack 40.

The film feeding mechanism 32 feeds the instant films 12 one by one from the film pack 40 loaded in the film pack loading chamber 30. The film feeding mechanism 32 comprises the claw 32a that is moved back and forth along the feeding direction of the instant film 12. The film feeding mechanism 32 scrapes out the instant films 12 in the case one by one by the claw 32a, and feeds the instant films 12 from the film pack 40.

The film transport mechanism 34 transports the instant film 12 fed from the film pack 40 by the film feeding mechanism 32 at a certain speed. The film transport mechanism 34 comprises a transport roller pair 34A and the spreading roller pair 34B. The transport roller pair 34A is driven by a motor (not shown) to rotate, and grips both sides of the instant film 12 to transport the instant film 12. The spreading roller pair 34B is driven by a motor (not shown) to rotate, and grips the entire instant film 12 to transport the instant film 12. The instant film 12 is subjected to the development treatment by pressing the pod portion 12d in the process of being transported by the spreading roller pair 34B.

The print head 36 records the image on the instant film 12 fed from the film pack 40. The print head 36 is configured by a line type exposure head. The print head 36 irradiates the exposure surface 12a of the instant film 12 transported by the film transport mechanism 34 with print light line by line, and records the image on the instant film 12 in a single pass.

[Electric Configuration of Printer]

Figure 8:
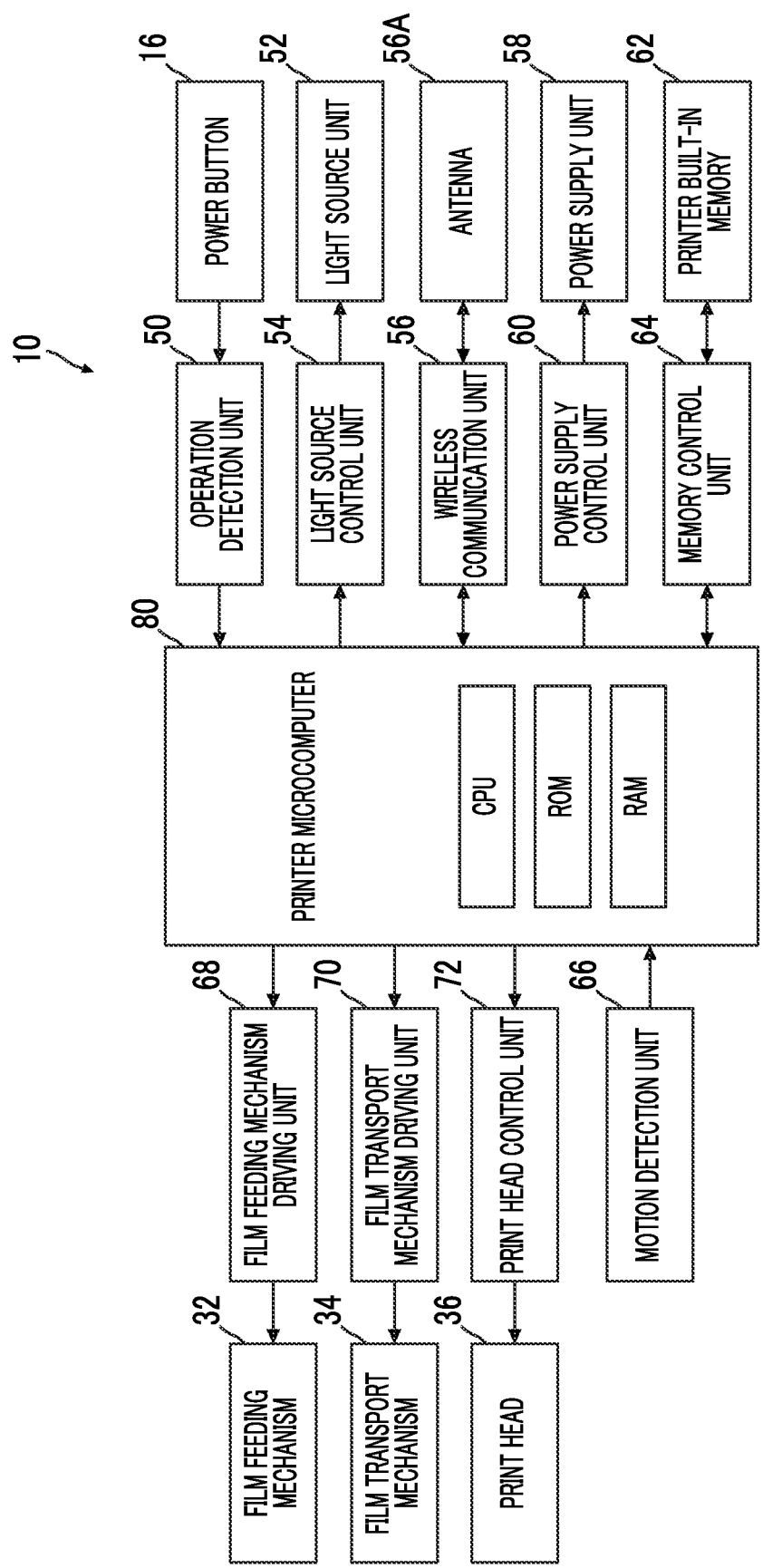
FIG. 8 is a block diagram showing an electric configuration of the printer.

FIG. 8 is a block diagram showing an electric configuration of the printer.

As shown in FIG. 8, the printer 10 comprises an operation detection unit 50 that detects an operation of the power button 16, a light source unit 52 that causes the power button 16 to emit the light, a light source control unit 54 that controls light emission of the light source unit 52, a wireless communication unit 56 that wirelessly communicates with the portable terminal via an antenna 56A, a power supply unit 58, a power supply control unit 60 that controls power supply from the power supply unit 58 and charging to power supply unit 58, a printer built-in memory 62, a memory control unit 64 that reads and writes data from and to the printer built-in memory 62, a motion detection unit 66 that detects the motion of the printer 10, a film feeding mechanism driving unit 68 that drives the film feeding mechanism 32, a film transport mechanism driving unit 70 that drives the film transport mechanism 34, a print head control unit 72 that drives the print head 36, a printer microcomputer 80, and the like.

The operation detection unit 50 detects the operation of the power button 16. The power button 16 is configured by a pressing button, and the power of the printer 10 is turned on and off by long pressing. While the power is turned on, a function of inputting a reprinting instruction is assigned to the power button 16. Reprinting is a function of printing the last print image again. The operation detection unit 50 detects short pressing (operation of pressing and immediately releasing) of the power button 16 while the power of the printer 10 is turned on, and outputs the detection signal to the printer microcomputer 80.

The light source unit 52 is configured such that the emission colors can be switched. In the printer 10 of the present embodiment, the light source unit 52 is a three-color LED (also referred to as a full-color LED) comprising three-color elements of red (R), green (G), and blue (B). The emission colors of the three-color LED can be switched by selecting the mixing ratio of the three colors of R, G, and B.

The light source unit 52 is disposed inside the power button 16 (see FIG. 4). Entire or a part of the power button 16 is transparent or translucent. In a case in which the light source unit 52 emits the light, the power button 16 transmits light from the transparent portion or the translucent portion and emits the light.

The light source control unit 54 causes the light source unit 52 to emit the light in predetermined emission color and emission pattern in response to the instruction from the printer microcomputer 80.

The wireless communication unit 56 wirelessly communicates with the portable terminal via the antenna 56A under the control of the printer microcomputer 80. As described above, the communication with the portable terminal 100 is performed by short range wireless communication.

The power supply unit 58 includes a battery and a power supply circuit, and supplies power to each of the units of the printer 10. The battery is configured by a rechargeable secondary battery, and is charged by receiving power supply from the outside.

The power supply control unit 60 controls the power supply from the power supply unit 58 to each of the units and the charging to the battery of the power supply unit 58 under the control of the printer microcomputer 80.

The printer built-in memory 62 configures a storage unit of the printer 10, and stores print image data, setting data of the printer 10, and the like. The printer built-in memory 62 is configured by, for example, a non-volatile memory such as an electrically erasable programmable read-only memory (EEPROM).

The memory control unit 64 reads and writes data from and to the printer built-in memory 62 in response to the instruction from the printer microcomputer 80.

The motion detection unit 66 detects the motion of the printer 10. The motion detection unit 66 is configured by, for example, a motion sensor. The motion sensor itself is known, and thus the detailed description thereof will be omitted. In general, the motion sensor is configured by combining an acceleration sensor, a gyro sensor, and the like. The motion detection unit 66 detects the posture of the printer 10 (vertical placement, horizontal placement, tilt, and the like) and the movement of the printer 10 (lifting, placing down, turning over, and the like).

The film feeding mechanism driving unit 68 includes a motor that drives the claw 32a of the film feeding mechanism 32 and a drive circuit thereof, and drives the film feeding mechanism 32 in response to the instruction from the printer microcomputer 80.

The film transport mechanism driving unit 70 includes a motor that drives the transport roller pair 34A of the film transport mechanism 34 and a drive circuit thereof, and a motor that drives the spreading roller pair 34B and a drive circuit thereof, and drives the film transport mechanism 34 in respond to the instruction from the printer microcomputer 80.

The print head control unit 72 includes a control circuit of the print head 36, and operates the print head 36 in response to the instruction from the printer microcomputer 80.

The printer microcomputer 80 is a control unit that integrally controls the operation of the printer 10. The printer microcomputer 80 is configured by a microcomputer comprising a central processing unit (CPU), a read only memory (ROM), and a random access memory (RAM), and executes a predetermined control program to realize various functions.

Figure 9:
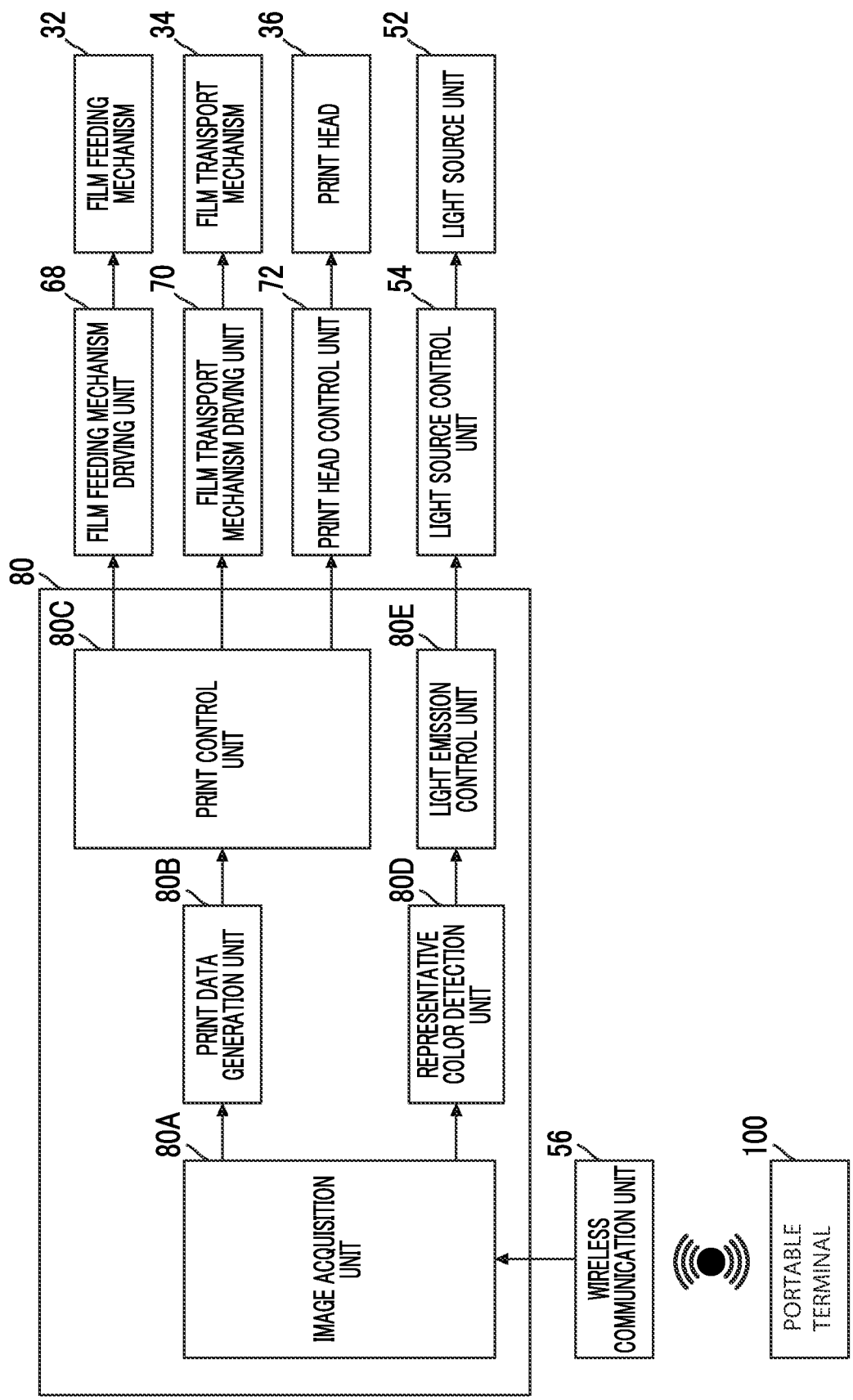
FIG. 9 is a block diagram of the main functions realized by a printer microcomputer.

FIG. 9 is a block diagram of the main functions realized by the printer microcomputer.

The printer microcomputer 80 mainly functions as an image acquisition unit 80A, a print data generation unit 80B, a print control unit 80C, a representative color detection unit 80D, a light emission control unit 80E, and the like.

The image acquisition unit 80A wirelessly communicates with the portable terminal 100 via the wireless communication unit 56, and acquires the image data of the image to be printed from the portable terminal 100. In a case of reprinting, the image data of the last print image is acquired by being read from the printer built-in memory 62.

The print data generation unit 80B converts the image data acquired by the image acquisition unit 80A into a data format that can be printed by the print unit (a data format that can be printed on the instant film 12 by the print head 36) to generate data for printing (print data).

The print control unit 80C controls the feeding of the instant film 12 by the film feeding mechanism 32 via the film feeding mechanism driving unit 68. Further, the print control unit 80C controls the transporting of the instant film 12 by the film transport mechanism 34 via the film transport mechanism driving unit 70. Further, the print control unit 80C controls the driving of the print head 36 via the print head control unit 72. The drive of the print head 36 is controlled in synchronization with the transport of the instant film 12 based on the print data generated by the print data generation unit 80B.

The representative color detection unit 80D detects a representative color of the image to be printed. The representative color of the image to be printed is a color mainly used in the image to be printed. For example, the representative color detection unit 80D obtains the color distribution of the entire image to be printed and detects the color occupying the widest area as the representative color. For example, as for an image of a sunset of which the entire screen is orange color, the orange color is detected as the representative color. Further, for example, in the image of grassland, green is detected as the representative color. The representative color detection unit 80D detects the representative color in a range of the color gamut that can be reproduced by the light source unit 52. Further, the representative color may be obtained from a part of the image to be printed or may be obtained by dividing the image to be printed into a plurality of regions. In a case in which the representative color is obtained from a part of the regions, for example, a detection region is set at the center of the image, and the representative color is detected from the detection region. In a case in which the representative color is obtained by dividing the image into a plurality of regions, for example, the image to be printed is equally divided into a plurality of regions in a vertical direction (for example, divided into three equal parts), and the representative color is detected from each region.

The light emission control unit 80E controls the light emission of the light source unit 52 via the light source control unit 54, and causes the power button 16 which is the light emitting unit to emit the light in predetermined color and pattern. The light emission control unit 80E causes the power button 16 to emit the light at predetermined timing. Specifically, in a case in which the image to be printed is received from the portable terminal 100 and in a case in which the image is printed, the light emission control unit 80E causes the power button 16 to emit the light. In a case in which the image to be printed is received from the portable terminal 100, the light is emitted by sequentially switching a plurality of predetermined colors at regular time intervals. For example, the light is emitted by sequentially switching seven colors of red, orange, yellow, green, light blue, blue, and purple (so-called rainbow colors) at regular time intervals. The light emission continues while the image is being received. On the other hand, in a case in which the image is printed, the light of the representative color detected by the representative color detection unit 80D is emitted. The light emission continues while the image is being printed. In a case in which the representative color is obtained by dividing the image into a plurality of regions, the light is emitted by sequentially switching the obtained representative color. For example, in a case in which the image to be printed is divided into three equal parts in the vertical direction and the representative color is detected from each region, the light of the representative color detected in each region is emitted sequentially from the top at regular time intervals. In a case in which an achromatic color such as black or gray is detected as the representative color, the light is emitted with a specific color instead of the achromatic color. Alternatively, the light is emitted in a specific light emission pattern (for example, the light is emitted by sequentially switching seven colors of red, orange, yellow, green, light blue, blue, and purple (so-called rainbow colors) at regular time intervals or a specific color is turned on and off (for example, white is turned on and off)). Alternatively, the light emission is stopped.

[Portable Terminal]

Figure 10:
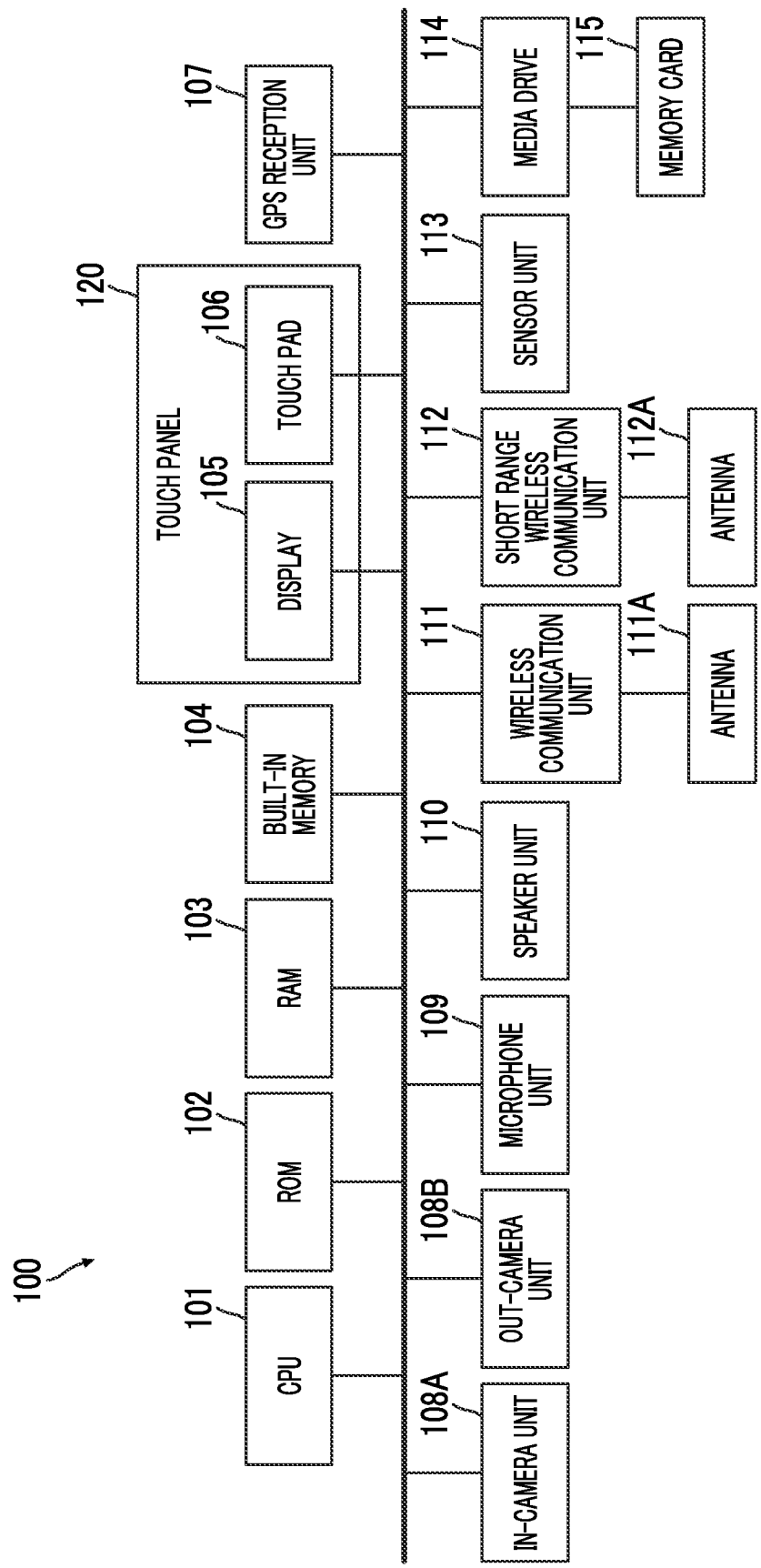
FIG. 10 is a block diagram showing an example of a hardware configuration of a portable terminal.

FIG. 10 is a block diagram showing an example of a hardware configuration of the portable terminal. FIG. 10 shows an example of a case in which the portable terminal 100 is configured by a smartphone.

As shown in FIG. 10, the portable terminal (smartphone) 100 comprises a CPU 101 that controls the entire operation, a ROM 102 that stores the basic input and output programs, a RAM 103 that is used as a work area of the CPU 101, a built-in memory 104, a display 105, a touch pad 106 that detects a touch operation (position input) on a display screen, a global positioning system (GPS) reception unit 107 that receives GPS signals including positional information (latitude, longitude, and altitude) of the portable terminal 100 by a GPS satellite or an indoor messaging system (IMES) as an indoor GPS, an in-camera unit 108A (a camera unit provided on the display side) and an out-camera unit 108B (a camera unit provided on the surface (rear surface) opposite to the display) which include imaging lenses and image sensors and electronically capture the image, a microphone unit 109 that includes a microphone and inputs voice, a speaker unit 110 that includes a speaker and outputs the voice, a wireless communication unit 111 that wirelessly communicates with the nearest base station and the like by using an antenna 111A, a short range wireless communication unit 112 that communicates with an external apparatus (for example, the printer 10 and the like) by short range radio by using an antenna 112A, a sensor unit 113 including various sensors such as a geomagnetic sensor, a gyro compass, an acceleration sensor, and the like, a media drive 114 that reads and writes the data from and to a memory card 115, and the like. The built-in memory 104 is configured by a non-volatile memory such as EEPROM. In the built-in memory 104, in addition to various programs including an operating system (for example, a display control program, and the like), various data such as image data of the images captured by the in-camera unit 108A and the out-camera unit 108B, image data acquired from other devices, and the like are stored. The display 105 and the touch pad 106 configure a touch panel 120. The short range wireless communication unit 112 is an example of a communication unit that communicates with the printer 10.

A screen of the touch panel 120 has a rectangular shape. The portable terminal 100 has a normal usage mode in which the screen of the touch panel 120 is vertically directed (a longitudinal direction of the screen is along the vertical direction). In the portable terminal 100 of the present embodiment, the longitudinal direction of the screen of the touch panel 120 is the vertical direction (Y direction in the drawings), and a direction orthogonal to the vertical direction (X direction in the drawing), that is, a direction of the short side of the screen is a width direction.

The portable terminal 100 has a function of causing the printer 10 to print the image captured by the in-camera unit 108A or the out-camera unit 108B in relation to the printer 10, a function of causing the printer 10 to print the image recorded on the built-in memory 104, a function of confirming a state of the printer 10 (for example, a remaining battery level, the number of printable sheets (the number of remaining films), and the like), and the like. Also, the portable terminal 100 has a function of editing the image to be printed in relation to image printing.

Figure 11:
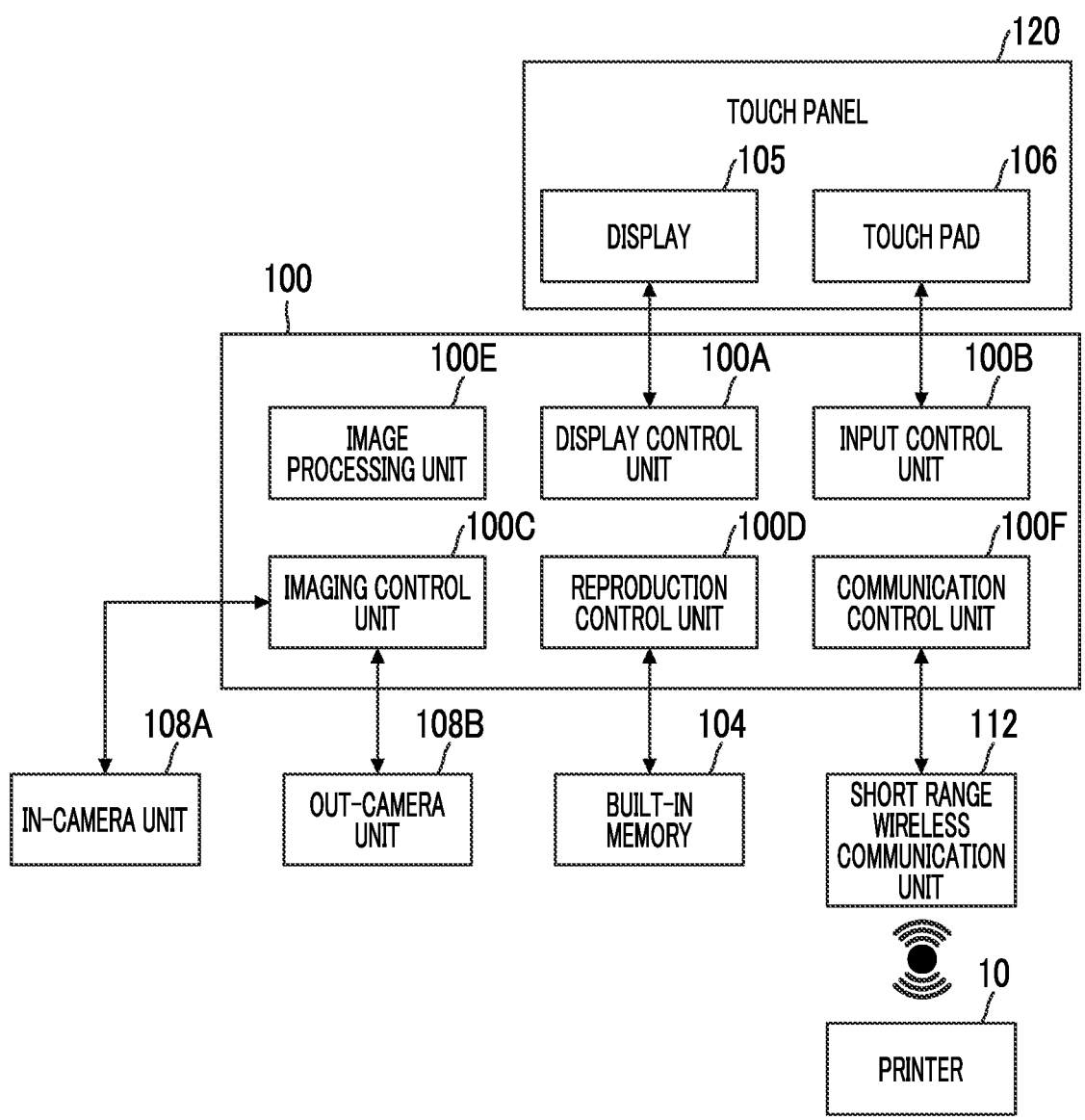
FIG. 11 is a block diagram of the main functions of the portable terminal with respect to image printing.

FIG. 11 is a block diagram of the main functions of the portable terminal with respect to image printing.

As shown in FIG. 11, the portable terminal 100 has, in relation to image printing, functions of a display control unit 100A that controls the display of the touch panel 120, an input control unit 100B that controls the input to the touch panel 120, an imaging control unit 100C that controls capturing of the image to be printed, a reproduction control unit 100D that controls the reproduction of the image to be printed, an image processing unit 100E that processes and edits the image to be printed, a communication control unit 100F that controls the communication with the printer 10, and the like.

The display control unit 100A controls the display of the screen of the touch panel 120 to display an operation screen on the touch panel 120 in a case in which the image is printed. The display control unit 100A controls the display of the display 105, which is a display unit, to control the display of the screen of the touch panel 120. The display of the operation screen, which will be described below, is controlled by the display control unit 100A.

The input control unit 100B controls the operation input to the touch panel 120 to control the operation input in a case in which the image is printed. The input control unit 100B controls the input of the touch pad 106, which is a position input unit of the touch panel 120, to control the operation input to the touch panel 120.

The imaging control unit 100C controls the in-camera unit 108A and the out-camera unit 108B based on the operation input to the touch panel 120 to control the capturing of the image to be printed.

The reproduction control unit 100D controls the access to the built-in memory 104 based on the operation input to the touch panel 120 to control the reproduction of the image to be printed.

The image processing unit 100E processes and edits the image to be printed based on the operation input to the touch panel 120. For example, image processing such as image expansion (trimming), image rotation, filter processing, template compositing, and collage is performed to process and edit the image to be printed. The filter processing refers to a function of changing a tone of the image or deforming the image. For example, the filter processing is tone correction, noise removal, mosaic processing, embossing, and the like. The template compositing refers to processing of compositing a template image with the image to generate a composite image. Further, the collage here is processing of applying the image to each region of a frame (division frame) of which an inside is divided into a plurality of regions to generate one composite image. The generated composite image is referred to as a collage image.

The communication control unit 100F controls the short range wireless communication unit 112 based on the operation input to the touch panel 120 to control the communication with the printer 10. The image to be printed and the printing instruction thereof are mainly transmitted from the portable terminal 100 to the printer 10. On the other hand, information indicating the state of the printer 10 (information on the remaining battery level, the number of printable sheets (the number of remaining films), and the like) is mainly transmitted from the printer 10 to the portable terminal 100. The communication control unit 100F is an example of a transmission control unit.

These functions are realized by the CPU 101 that executes a predetermined program (display control program or the like).

[Operation Screen]

Hereinafter, the operation screen of the portable terminal 100 in a case in which the image captured by the portable terminal 100 and the image stored in the portable terminal 100 are printed by the printer 10 will be described.

Figure 12:
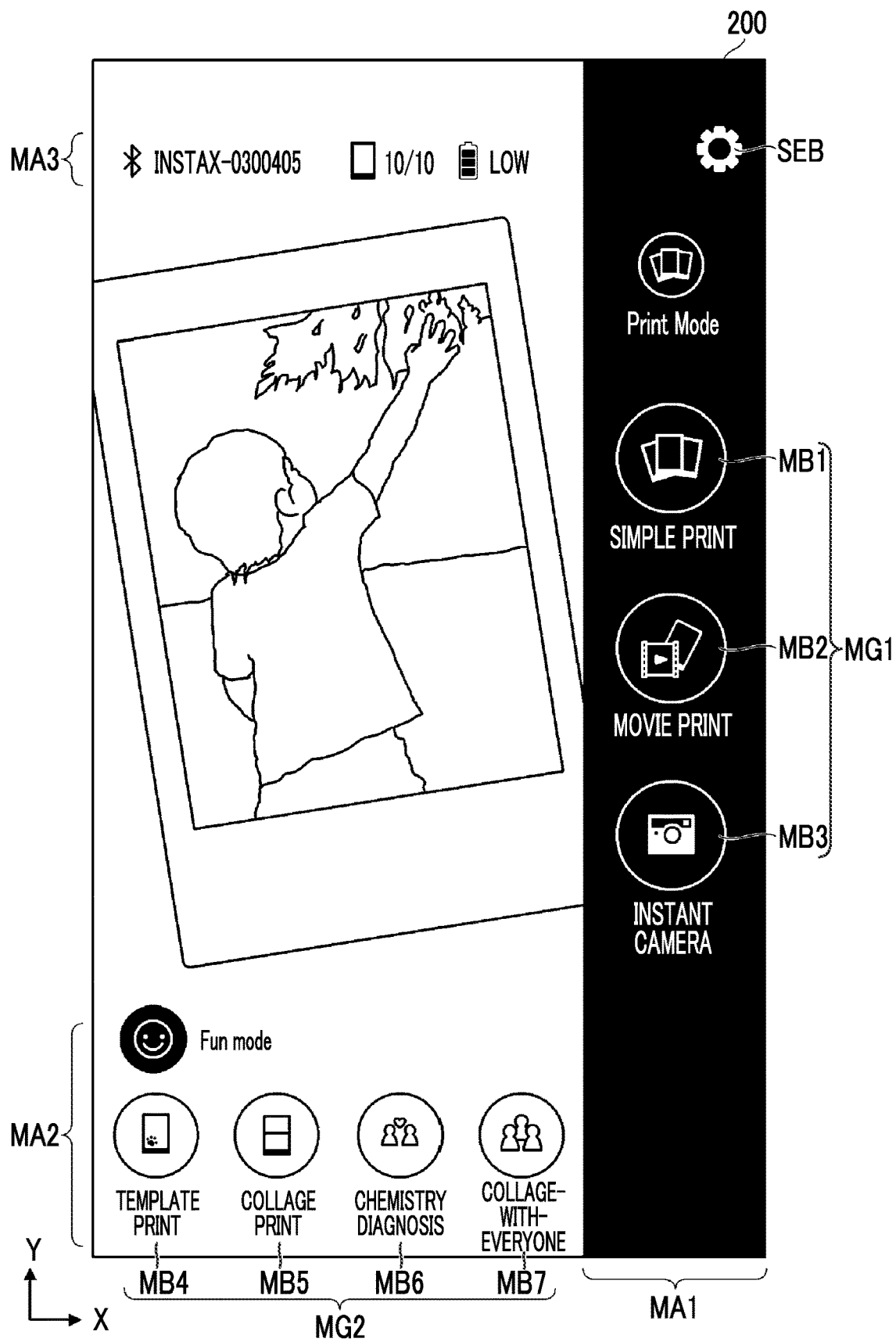
FIG. 12 is a view showing an example of a top screen.

[Top Screen] FIG. 12 is a view showing an example of a top screen.

A top screen (also referred to as a home screen) 200 is a screen of a main menu. Buttons of available functions are displayed on a top screen 200 as icons. That is, the buttons are displayed in a combination of figures, symbols, or patterns. Specifically, as shown in FIG. 12, a simple print button MB1, which is a button of a function of "simple printing", a movie print button MB2, which is a button of a function of "movie printing", an instant camera button MB3, which is a button of a function of "instant camera", a template print button MB4, which is a button of a function of "template printing", a collage print button MB5, which is a button of a function of "collage printing", a chemistry diagnosis button MB6, which is a button of a function of "chemistry diagnosis", and a collage-with-everyone button MB7, which is a button of a function of "collage with everyone" are displayed. Each button has a menu title at the lower portion thereof.

The function of simple printing is a function of printing the image (still image) stored in the portable terminal 100. In a case in which the simple print button MB1 is touched on the screen, the function is activated.

The function of movie printing is a function of extracting one scene from a motion picture and printing the extracted scene. In a case in which the movie print button MB2 is touched on the screen, the function is activated.

The function of the instant camera is a function of capturing the image by using the camera function of the portable terminal 100 and printing the captured image by the printer 10. In a case in which the instant camera button MB3 is touched on the screen, the function is activated.

The function of template printing is a function of compositing the template image with the image and printing the composite image. In a case in which the template print button MB4 is touched on the screen, the function is activated.

The function of collage printing is a function of generating the collage image and printing the generated collage image. As described above, the collage image is generated by applying the image to each region of the frame (division frame) of which the inside is divided into a plurality of regions. As the division mode, there are regular divisions (for example, division into upper and lower halves, division into left and right halves, division into upper and lower three equal parts, division into left and right three equal parts, division into four equal parts, division into nine equal parts, and the like) and irregular divisions. In particular, the regular divisions are also referred to as division prints. In a case in which the collage print button MB5 is touched on the screen, the function is activated.

The function of chemistry diagnosis is a function of performing chemistry diagnosis from the image. For example, a learned model is used to analyze the image and diagnose the chemistry of persons (two) in the image. In a case in which the chemistry diagnosis button MB6 is touched on the screen, the function is activated.

The function of collage with everyone is a function of generating the collage image by a plurality of people together and printing the collage image. In a case in which the collage-with-everyone button MB7 is touched on the screen, the function is activated.

As shown in FIG. 12, on the top screen 200, the buttons of the functions are grouped in two groups and displayed (a first group MG1 and a second group MG2).

The first group MG1 is a group to which the buttons of functions of simple printing, movie printing, and instant camera belong. The first group MG1 is a group of functions of which the main purpose is the simple printing. This group is referred to as a "print mode" group.

The second group MG2 is a group to which the buttons of the functions of template printing, collage printing, chemistry diagnosis, and collage with everyone belong. The second group MG2 is a group of functions of which the main purpose is advanced printing that requires processing and editing. This group is referred to as a "fun mode" group.

The buttons belonging to the first group MG1 (the simple print button MB1, the movie print button MB2, and the instant camera button MB3) are displayed in a first group display region MA1, and the buttons belonging to the second group MG2 (the template print button MB4, the collage print button MB5, the chemistry diagnosis button MB6, and the collage-with-everyone button MB7) are displayed in a second group display region MA2. The first group display region MA1 is set at the right end of the screen of the top screen 200, and the second group display region MA2 is set at the lower portion of the screen.

A setting button SEB is further displayed on the top screen 200. The setting button SEB is a button for calling a screen (setting screen) for performing various settings. The setting button SEB is displayed on the upper right of the screen.

In a case in which the printer 10 is connected (communication is established), the information of the connected printer 10 is displayed on the top screen 200. The information of the printer 10 is displayed in a printer information display region MA3. The printer information display region MA3 is set at the upper portion of the screen. In the printer information display region MA3, pieces of information on a name of the connected printer 10 (for example, a model name), the number of printable sheets (the number of remaining films), and the remaining battery level are displayed. These pieces of information are acquired from the printer 10 in a case in which the communication with the printer 10 is established.

(A) Print Operation Using Function of Simple Printing

Here, the configuration of the operation screen in a case in which the image is printed using the function of simple printing will be described.

As described above, the function of simple printing is the function of printing the image stored in the portable terminal 100. A rough operation procedure is (1) selection of the image to be printed and (2) printing instruction. If necessary, the image is processed and edited.

[Image Selection Screen]

In a case in which the simple print button MB1 is touched on the top screen 200, the function of simple printing is activated.

In a case in which the function of simple printing is activated, the screen of the touch panel 120 is switched to an image selection screen 201. This screen is a screen for selecting the image to be printed.

Figure 13:
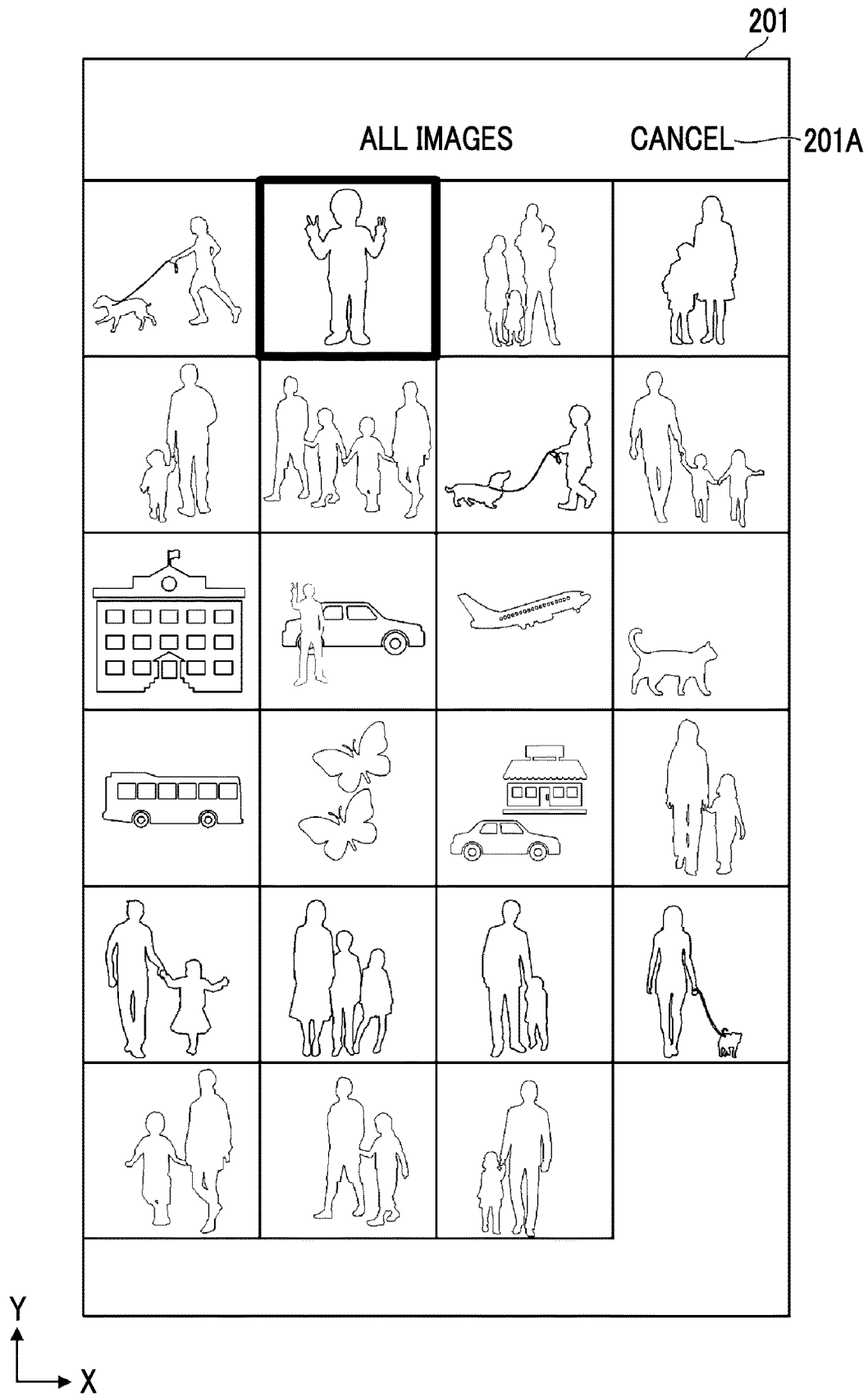
FIG. 13 is a view showing an example of an image selection screen.

FIG. 13 is a view showing an example of the image selection screen.

As shown in FIG. 13, on the image selection screen 201, the images stored in the portable terminal 100 are displayed as a list in a thumbnail format. That is, the images are displayed as a list in a format with reduced images.

A user touches a thumbnail image of the image to be printed on the screen and selects the image to be printed.

FIG. 13 shows an example of a case in which all the images stored in the portable terminal 100 are displayed as a list. In addition, the format may be a format in which only the images in a designated folder are displayed.

Further, as shown in FIG. 13, a cancel button 201A is displayed on the image selection screen 201. The cancel button 201A is a button for providing an instruction for the cancel of image selection processing. In a case in which the cancel button 201A is touched, the function of simple printing ends. In this case, the display of the screen is switched to the top screen 200.

[Print Image Confirmation Screen]

In a case in which the image to be printed is selected, the screen of the touch panel 120 is switched to a print image confirmation screen 202. This screen is a screen for confirming the image to be printed (print image).

Figure 14:
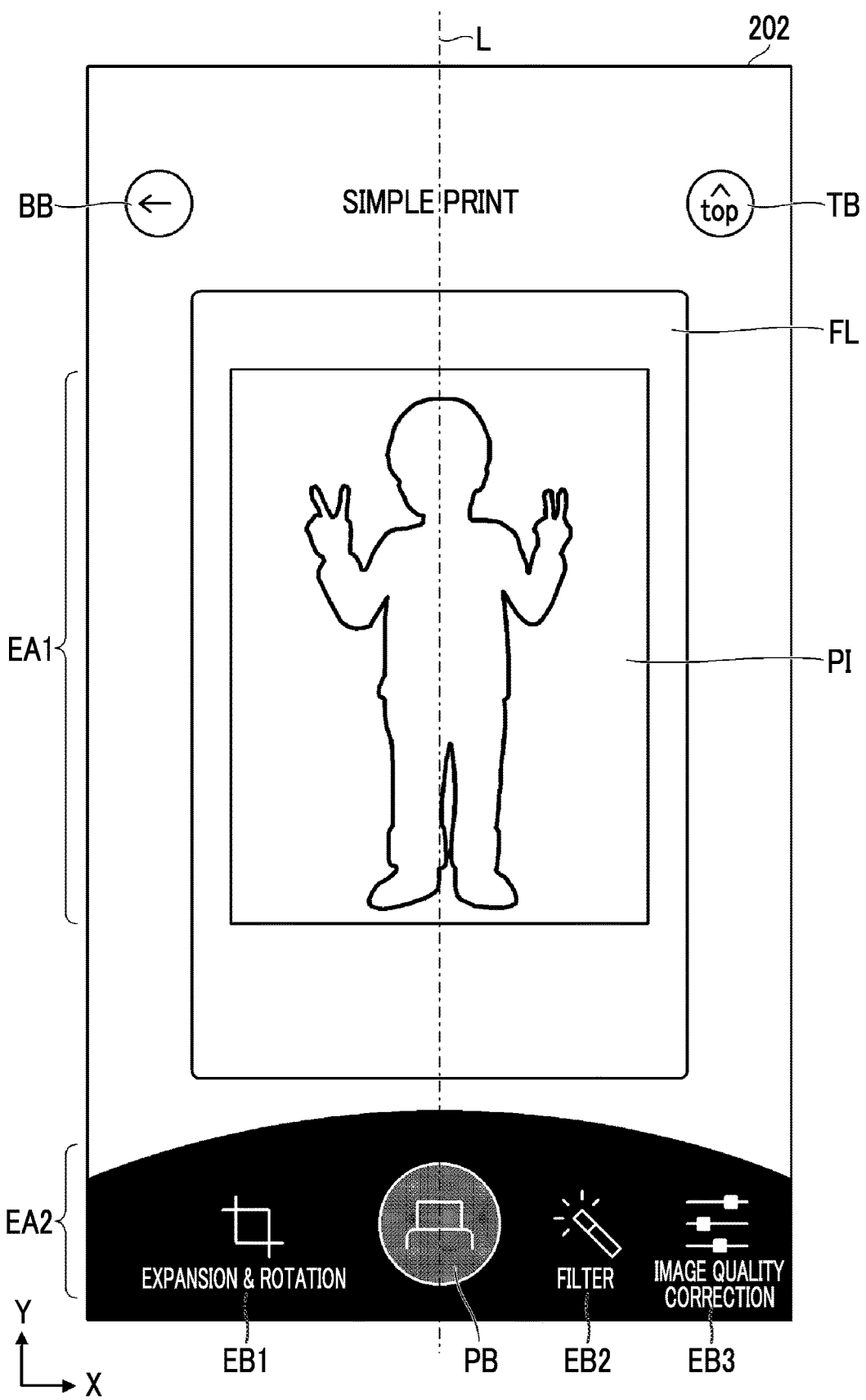
FIG. 14 is a view showing an example of a print image confirmation screen.

FIG. 14 is a view showing an example of the print image confirmation screen.

As shown in FIG. 14, a print image PI, a print button PB for providing the instruction for printing of the print image PI, an image editing menu button, and the like are displayed on the print image confirmation screen 202.

The print image PI is displayed in an image display region EA1 set in the screen. The image display region EA1 is set on a center line L, in a case in which the center line L is a straight line passing through the center of the print image confirmation screen 202 in the width direction (X direction in FIG. 14). In the example shown in FIG. 14, an example of a case is shown in which the center line L is set to a substantially center position. A direction of the center line L is a direction along the longitudinal direction of the screen (vertical direction, Y direction in FIG. 14).

A frame FL that surrounds the image (print image PI) displayed in the image display region EA1 is displayed around the image display region EA1. This frame FL has the same margin as a printed result (printed article). That is, the frame FL has the same margin as the instant film 12 (has the same ratio as the frame 12$i$ provided around the observation region 12$h$ of the instant film 12). As a result, the final printed result can be easily confirmed on the screen.

The print button PB and the image editing menu buttons (an expansion & rotation button EB1, a filter button EB2, and an image quality correction button EB3) are displayed in a button display region EA2. The button display region EA2 is set at the lower portion of the screen. The print button PB and the image editing menu buttons (the expansion & rotation button EB1, the filter button EB2, and the image quality correction button EB3) are displayed in the button display region EA2 while being arranged in a row along the width direction of the screen (X direction in FIG. 14). In this case, the print button PB is disposed on the center line L and three image editing menu buttons (the expansion & rotation button EB1, the filter button EB2, and the image quality correction button EB3) are arranged and displayed on both sides of the print button PB. More specifically, the expansion & rotation button EB1 is disposed on the left side of the print button PB, and the filter button EB2 and the image quality correction button EB3 are disposed on the right side of the print button PB.

The print button PB and the image editing menu buttons (the expansion & rotation button EB1, the filter button EB2, and the image quality correction button EB3) are displayed as the icons, respectively. Further, the print button PB at the center is formed in a larger size than other buttons (the expansion & rotation button EB1, the filter button EB2, and the image quality correction button EB3) (the image portion that configures the button is formed in a large size). Further, in the present embodiment, the print button PB is formed in a different color from other buttons. Specifically, the print button PB is formed in red while other buttons are formed in white. As a result, a printing instruction operation can be easily confirmed. In a case in which other buttons are selected (touched), the colors thereof are changed. As a result, the selected function can be clarified.

The menu titles are displayed on the lower portion of the image editing menu buttons (the expansion & rotation button EB1, the filter button EB2, and the image quality correction button EB3). FIG. 14 shows an example of a case in which functions of expansion and rotation, a function of filter, and a function of image quality correction are provided as the image editing menu.

The functions of expansion and rotation are functions of expanding and rotating the image. The functions of expansion and rotation are assigned to the expansion & rotation button EB1. In a case in which the expansion & rotation button EB1 is touched on the screen, the functions of expansion and rotation are activated, and the image expansion and rotation can be performed on the print image PI.

The function of filter is a function of performing the filter processing on the image. The function of filter is assigned to the filter button EB2. In a case in which the filter button EB2 is touched on the screen, the function of filter is activated and the print image PI can be subjected to the filter processing.

The function of image quality correction is a function of correcting brightness, contrast, and chroma saturation of the image. The function of image quality correction is assigned to the image quality correction button EB3. In a case in which the image quality correction button EB3 is touched on the screen, the function of image quality correction is activated, and the image quality correction (correction of the brightness, the contrast, and the chroma saturation of the image) can be performed on the print image PI.

Each function is turned on (activated) by touching each corresponding button on the screen, and turned off by touching the button again. Also, in a case in which the button of another function is touched while one function is activated, the activated function is switched to the touched function. For example, in a case in which the image quality correction button EB3 is touched while the function of filter is activated, the function of filter ends and the function of image quality correction is turned on.

As shown in FIG. 14, a back button BB and a top button TB are displayed on the print image confirmation screen 202. The back button BB is a button for providing an instruction for returning a previous screen. The top button TB is a button for providing an instruction for returning to the top screen 200. The back button BB and the top button TB are disposed at the upper portion of the screen.

[Expansion and Rotation Operation Screen]

In a case in which the expansion & rotation button EB1 is touched on the screen, the screen is switched to the operation screen for the functions of expansion and rotation, that is, an operation screen (expansion & rotation operation screen) 203 for performing the image expansion operation and the image rotation operation.

Figure 15:
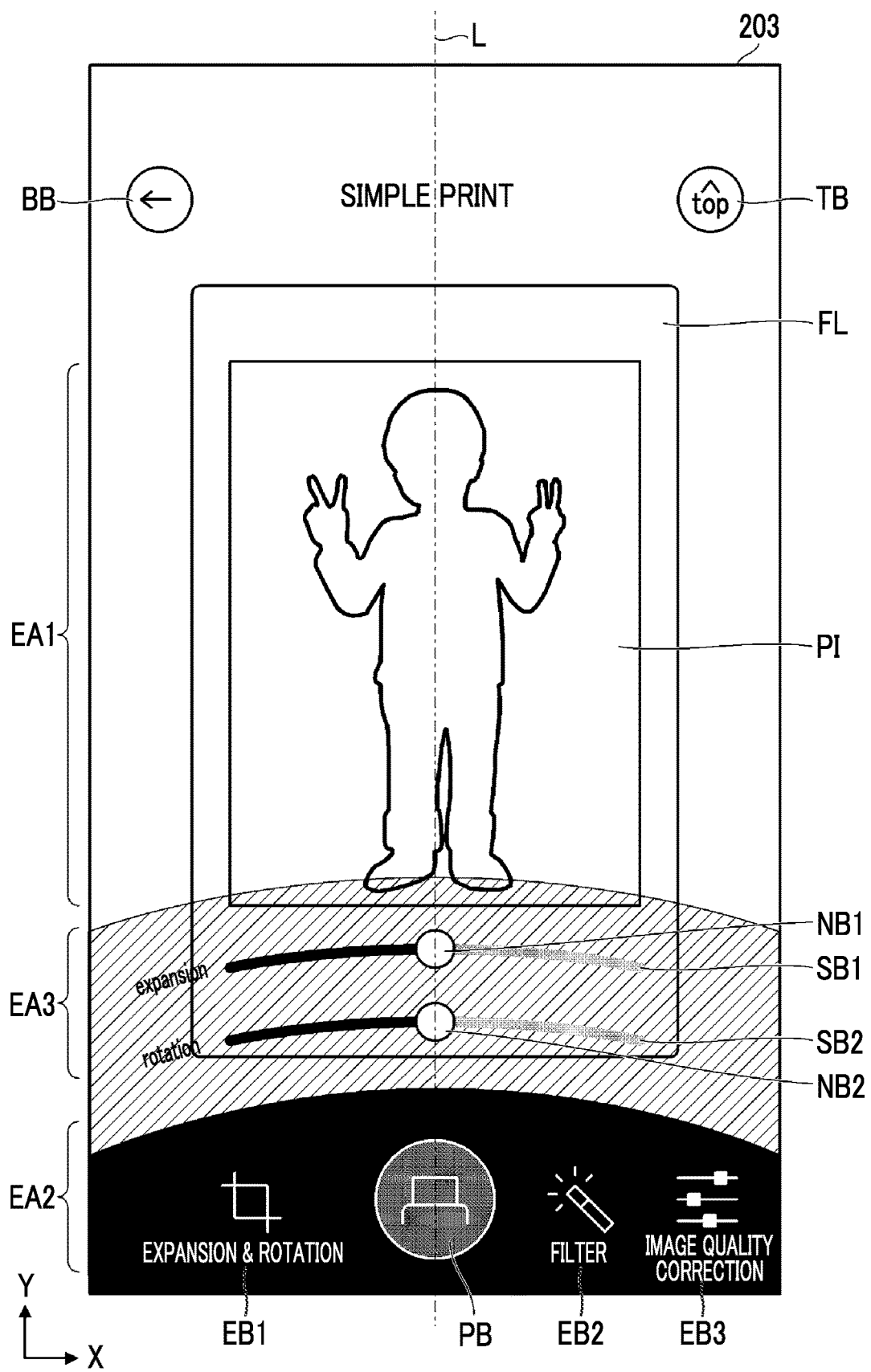
FIG. 15 is a view showing an example of an expansion and rotation operation screen.

FIG. 15 is a view showing an example of the expansion and rotation operation screen.

On the expansion and rotation operation screen 203, in addition to the display contents on the print image confirmation screen 202, a slide bar SB1 for expansion, which is used for the expansion operation, and a slide bar SB2 for rotation, which is used for the rotation operation are displayed.

The slide bar SB1 for expansion is operated by sliding a knob NB1 thereof (touching and sliding the knob NB1). In a case in which the slide bar SB1 for expansion is operated, the image is expanded in accordance with an amount of the operation. The print image PI is expanded in a case in which the knob NB1 is slid in the right direction of the screen, and reduced in a case in which the knob NB1 is slid in the left direction thereof.

The slide bar SB2 for rotation is operated by sliding a knob NB2 thereof. In a case in which the slide bar SB2 for rotation is operated, the image is rotated in accordance with the amount of the operation. The print image PI is rotated clockwise in a case in which the knob NB2 is slid in the right direction of the screen, and rotated counterclockwise in a case in which the knob NB2 is slid in the left direction. In a case in which the knob NB2 is slid from the left end to the right end of the bar, the image is rotated once.

The slide bar SB1 for expansion and the slide bar SB2 for rotation are displayed in an operation region EA3. The operation region EA3 is set between the image display region EA1 and the button display region EA2 in a direction (Y direction) along the center line L. As shown in FIG. 15, the slide bar SB1 for expansion and the slide bar SB2 for rotation are arranged vertically in the operation region EA3. Further, both the slide bar SB1 for expansion and the slide bar SB2 for rotation are displayed in a curved arc shape. More specifically, the slide bars are displayed along a circle around on a point set on the center line L, and are displayed symmetrically with the center line L as a reference. By displaying the bars in a curved arc shape in this way, the overall length can be made longer than a case in which the bars are displayed in a straight line. As a result, the resolution of the operation can be improved, and more detailed operation can be performed. This configuration works particularly effectively in a case in which the display size of the screen is small.

[Filter Operation Screen]

In a case in which the filter button EB2 is touched on the screen, the screen is switched to the operation screen of the function of filter, that is, an operation screen (filter operation screen) 204 for performing the operation of filter processing on the image.

Figure 16:
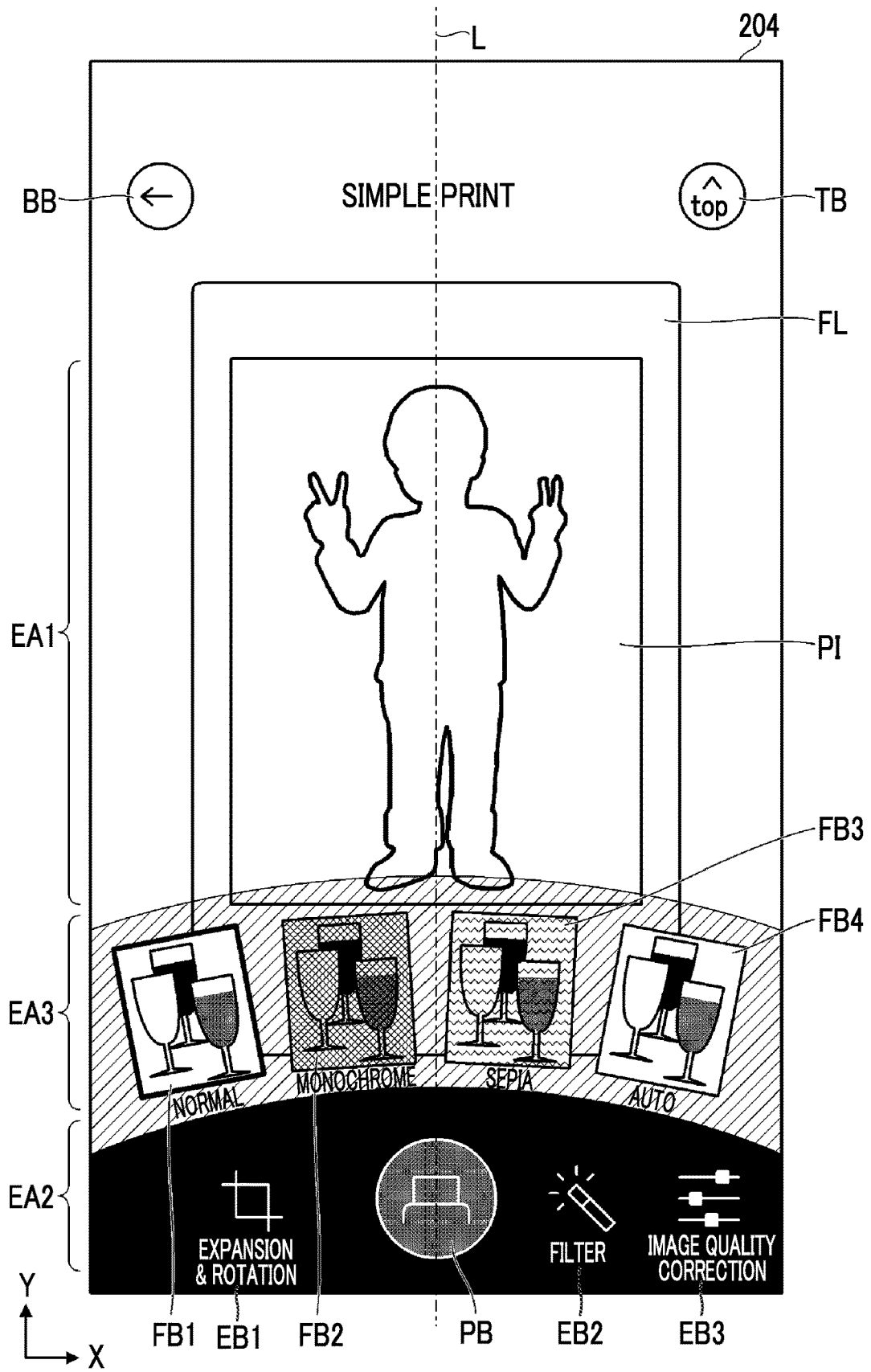
FIG. 16 is a view showing an example of a filter operation screen.

FIG. 16 is a view showing an example of the filter operation screen.

On the filter operation screen 204, in addition to the display contents on the print image confirmation screen 202, a selection button of a filter to be applied is displayed. FIG. 16 shows an example of a case in which four buttons are displayed as the selection buttons. Specifically, an example of a case is shown in which a normal button FB1 for returning a state to a normal state, a monochrome button FB2 for applying a monochrome filter, a sepia button FB3 for applying a sepia filter, and an auto button FB4 for applying an auto filter are displayed.

Here, the monochrome filter is a filter that changes the image to monochrome in black and white. In a case in which the monochrome button FB2 is touched on the screen, the print image PI displayed in the image display region EA1 is changed to monochrome in black and white.

The sepia filter is a filter that changes the tone of the image to sepia. In a case in which the sepia button FB3 is touched on the screen, the tone of the print image PI displayed in the image display region EA1 is changed to sepia.

The auto filter is a filter that automatically optimizes the tone of the image. In a case in which the auto button FB4 is touched on the screen, the tone of the print image PI displayed in the image display region EA1 is automatically corrected.

In a case in which the normal button FB1 is touched on the screen, the applied filter is cancelled and the state returns to an original state.

The selection buttons of the filters (the normal button FB1, the monochrome button FB2, the sepia button FB3, and the auto button FB4) have a rectangular shape corresponding to the outer shape of the print image PI displayed in the image display region EA1. More specifically, a shape of the selection button of the filter is similar to the outer shape of the print image PI (including a shape recognized to be almost similar).

In addition, each button displays a common image which is subjected to the same filter processing as the applied filter. For example, in the image that forms the monochrome button FB2, an image which is changed to monochrome in black and white is displayed.

Further, the buttons are expanded and displayed in the operation region EA3, and are displayed in a radial pattern around the point set on the center line L. By displaying the buttons in a radial pattern in this way, the number and size of buttons that can be displayed can be increased as compared with the case in which the buttons are displayed side by side in a straight line. Therefore, the operability can be improved. The number of buttons displayed on one screen can be adjusted by adjusting a curvature of the arc. That is, in a case in which the sizes of the buttons are the same, the number of buttons that can be displayed at one time can be increased as the curvature is increased (the curve is increased).

The selection buttons of the filters (the normal button FB1, the monochrome button FB2, the sepia button FB3, and the auto button FB4) are examples of operation buttons for image editing.

[Image Quality Correction Operation Screen]

In a case in which the image quality correction button EB3 is touched on the screen, the screen is switched to the operation screen for the function of image quality correction, that is, an operation screen (image quality correction operation screen) 205 for performing the correction of the brightness, the contrast, and the chroma saturation of the image.

Figure 17:
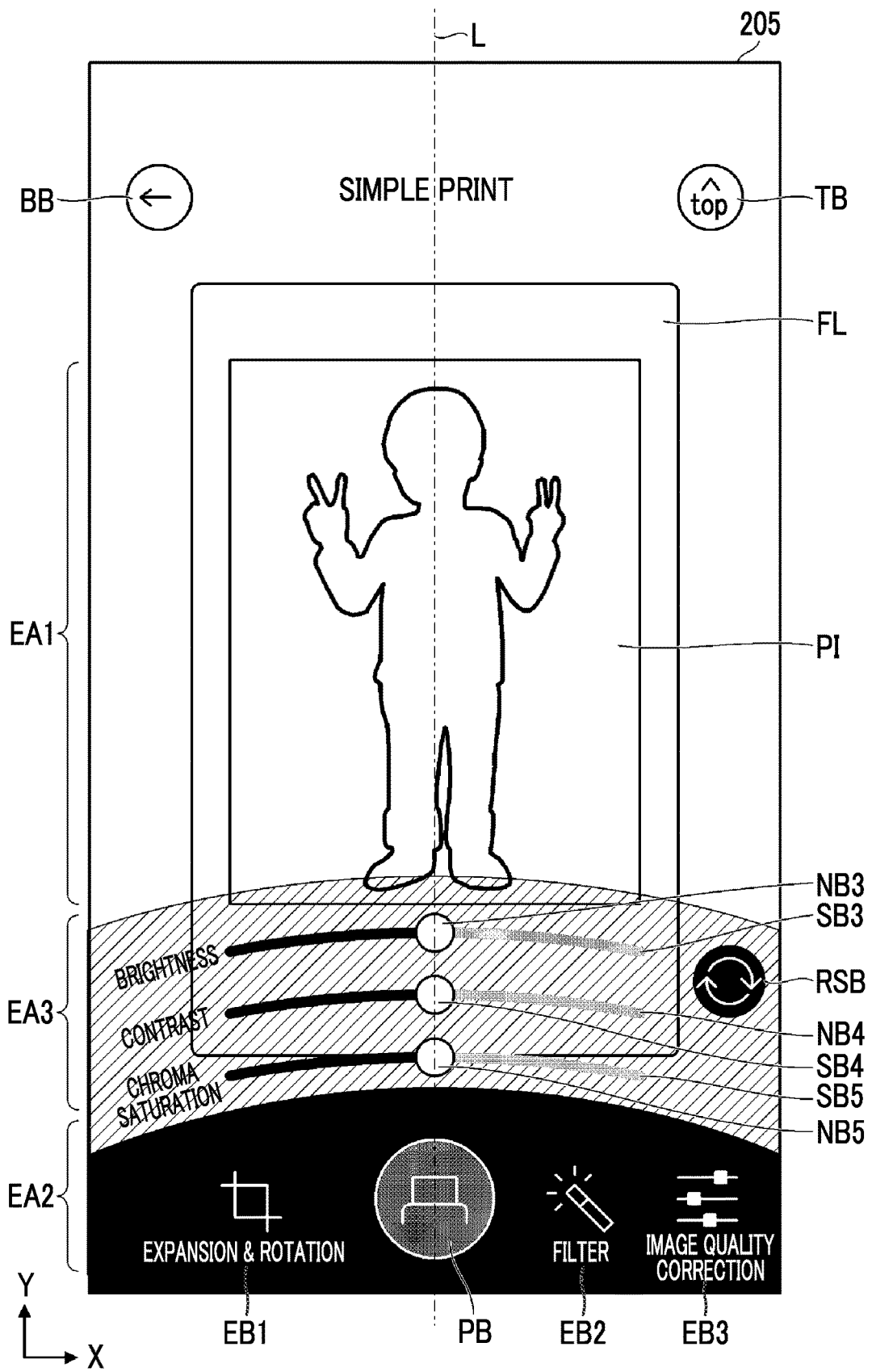
FIG. 17 is a view showing an example of an image quality correction operation screen.

FIG. 17 is a view showing an example of the image quality correction operation screen.

On the image quality correction operation screen 205, in addition to the display contents on the print image confirmation screen 202, a slide bar SB3 for brightness adjustment, which is used for adjusting the brightness of the image, a slide bar SB4 for contrast adjustment, which is used for adjusting the contrast of the image, a slide bar SB5 for chroma saturation adjustment, which is used for adjusting the chroma saturation of the image, and a reset button RSB are displayed.

The slide bar SB3 for brightness adjustment is operated by sliding a knob NB3 thereof. In a case in which the slide bar SB3 for brightness adjustment is operated, the brightness of the image is changed in accordance with the amount of the operation. The knob NB3 is positioned at the center of the bar by default. The print image PI becomes bright in a case in which the knob NB3 is slid in the right direction of the screen, and becomes dark in a case in which the knob NB3 is slid in the left direction.

The slide bar SB4 for contrast adjustment is operated by sliding a knob NB4 thereof. In a case in which the slide bar SB4 for contrast adjustment is operated, the contrast of the image is changed in accordance with the amount of the operation. The knob NB4 is positioned at the center of the bar by default. The contrast of the print image PI is increased in a case in which the knob NB4 is slid in the right direction of the screen, and the contrast is decreased in a case in which the knob NB4 is slid in the left direction.

The slide bar SB5 for chroma saturation adjustment is operated by sliding a knob NB5 thereof. In a case in which the slide bar SB5 for chroma saturation adjustment is operated, the chroma saturation of the image is changed in accordance with the amount of the operation. The knob NB5 is positioned at the center of the bar by default. The chroma saturation of the print image PI is increased in a case in which the knob NB5 is slid in the right direction of the screen, and the chroma saturation is decreased in a case in which the knob NB5 is slid in the left direction.

The reset button RSB is a button for resetting the operation of each slide bar (the slide bar SB3 for brightness adjustment, the slide bar SB4 for contrast adjustment, and the slide bar SB5 for chroma saturation adjustment). In a case in which the reset button RSB is touched, the operation of each slide bar is reset. That is, the knob of each slide bar returns to a default position (center).

The slide bars (the slide bar SB3 for brightness adjustment, the slide bar SB4 for contrast adjustment, and the slide bar SB5 for chroma saturation adjustment) and the reset button RSB are displayed in the operation region EA3. As shown in FIG. 17, the slide bars are arranged vertically in the operation region EA3. Further, the slide bars are displayed in a curved arc shape. More specifically, the slide bars are displayed along a circle around on a point set on the center line L, and are displayed symmetrically with the center line L as a reference. As a result, the resolution of the operation can be improved, and more detailed operation can be performed. The reset button RSB is disposed at the right end of the operation region EA3.

[Operation Screen In Case In Which Printing Is Executed]

In a case in which the print button PB is touched on the screen, the instruction for printing of the print image PI displayed in the image display region EA1 is provided. In a case in which the instruction for printing is provided, the image data of the print image PI is transmitted to the printer 10.

In a case in which the transmission of the print image PI is executed, the image of the image transmission is displayed as an animation. Specifically, the image in which the print image PI is moved together with the frame FL and disappears from the edge of the screen is displayed by the animation.

Figure 18:
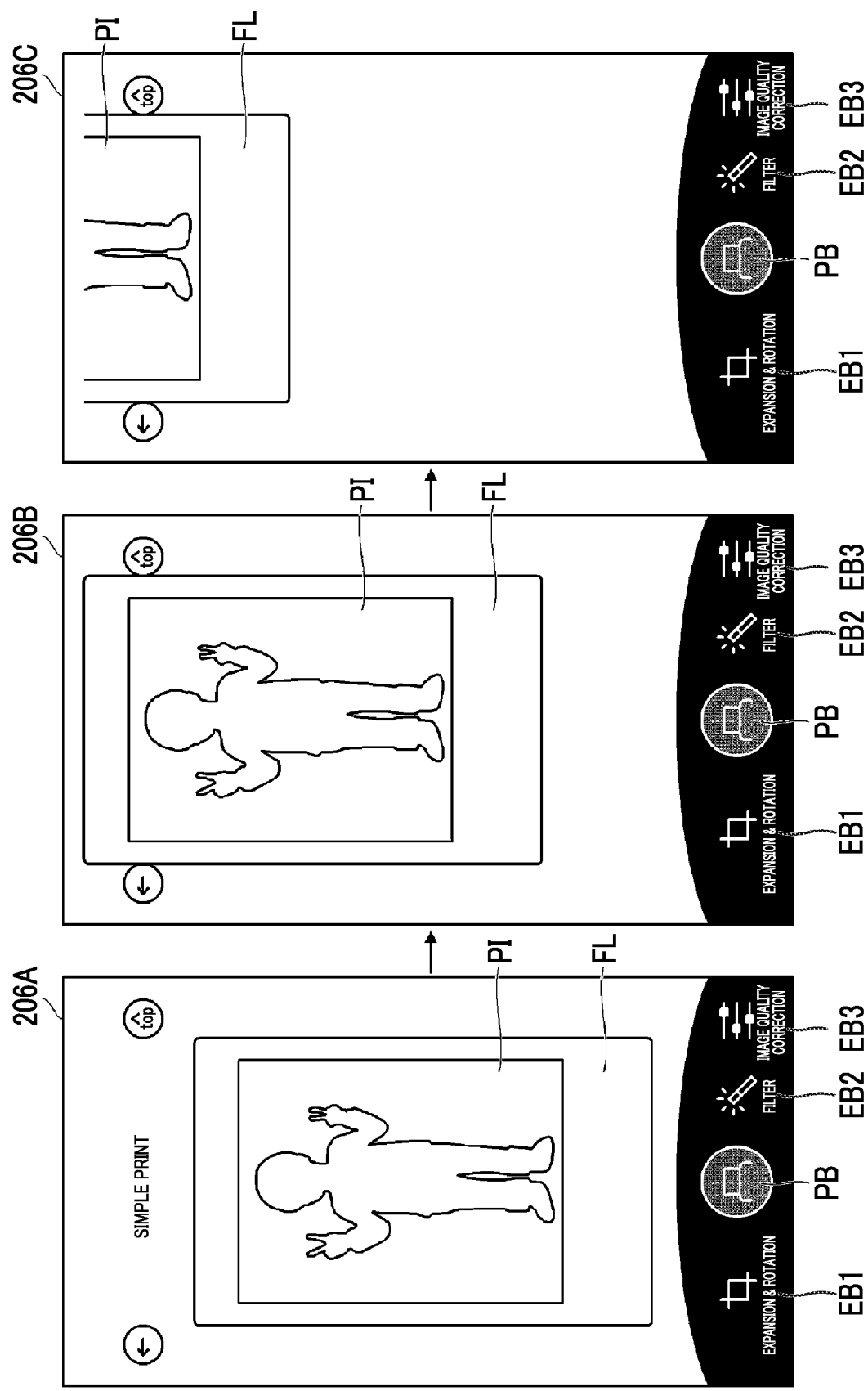
FIG. 18 is a view showing an example of an animation display in a case in which an instruction for printing is provided.

FIG. 18 is a view showing an example of an animation display in a case in which the instruction for printing is provided.

In a case in which the instruction for printing is provided, the screen is changed to a screen 206A, a screen 206B, and a screen 206C in time series. As shown in FIG. 18, the print image PI is moved upward along the longitudinal direction of the screen together with the frame FL and disappears from the upper edge of the screen (simulating a motion picture in which the instant film is fed). This makes it easier to recognize that the image is transmitted to the printer.

(B) Print Operation Using Function of Template Printing

Here, the configuration of the operation screen in a case in which the image is printed using the function of template printing will be described.

The template printing is the function of compositing the template image with the image to generate the composite image and printing the composite image. As the image to be composited, the image stored in the portable terminal 100 is used. A rough operation procedure of template printing is (1) selection of the template, (2) selection of the image to be printed, and (3) printing instruction. If necessary, the image is processed and edited.

[Template Selection Screen]

In a case in which the template print button MB4 is touched on the top screen 200, the function of template printing is activated. In a case in which the function of template printing is activated, the screen of the touch panel 120 is switched to a template selection screen 210. This screen is a screen for selecting the template image to be composited with the image to be printed.

Figure 19:
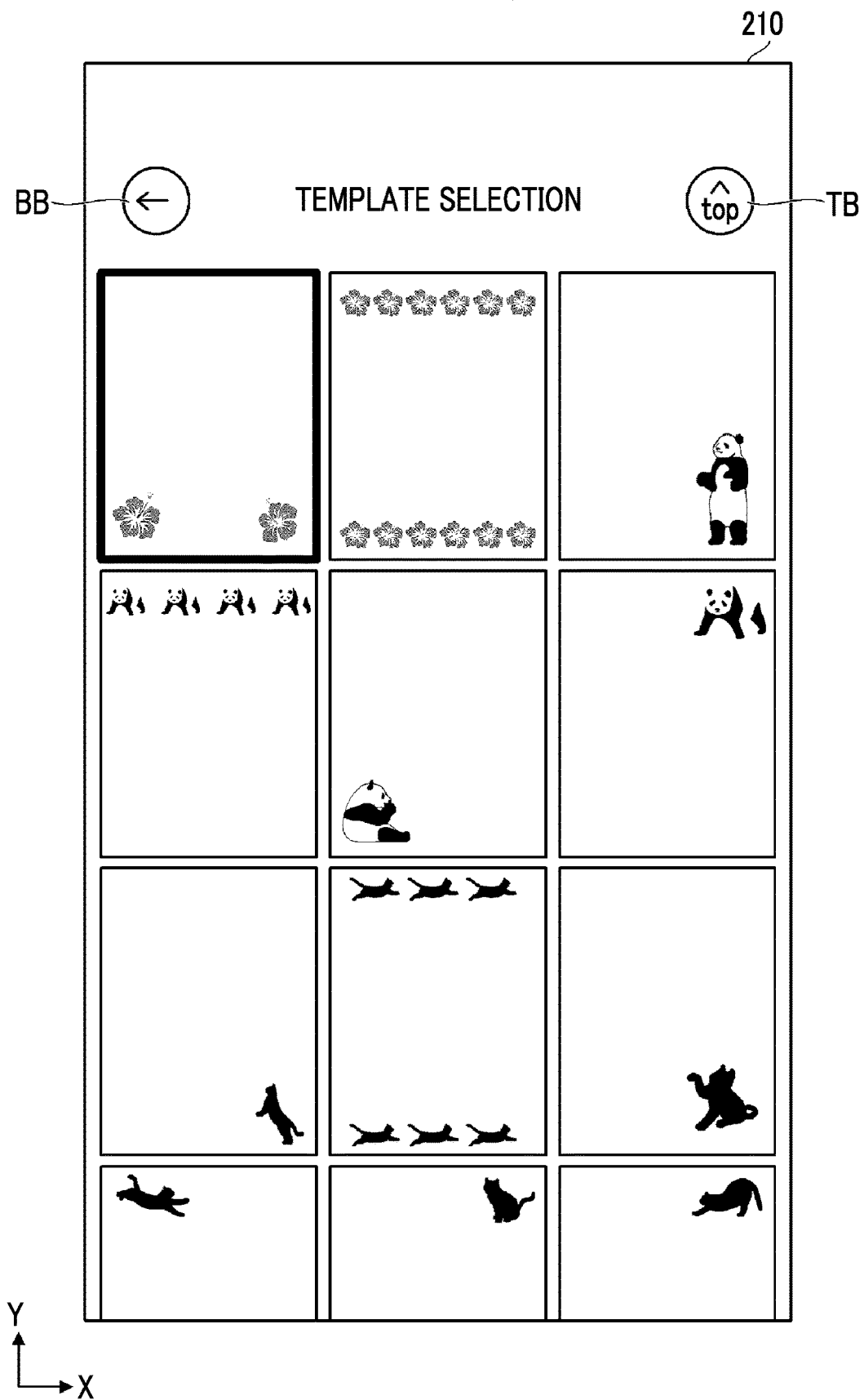
FIG. 19 is a view showing an example of a template print selection screen.

FIG. 19 is a view showing an example of the template print selection screen.

As shown in FIG. 19, available template images are displayed as a list on the template selection screen 210 in a thumbnail format. The user touches the template image of the pattern desired to be used on the screen to select the template image to be used.

[Image Selection Screen]

In a case in which the template image to be used is selected on the template selection screen 210, the screen of the touch panel 120 is switched to the image selection screen 201 (see FIG. 13). The user selects the image to be printed on this screen.

[Print Image Confirmation Screen]

In a case in which the image to be printed is selected, the screen of the touch panel 120 is switched to the print image confirmation screen 202. This screen is a screen for confirming the image to be printed (print image).

Figure 20:
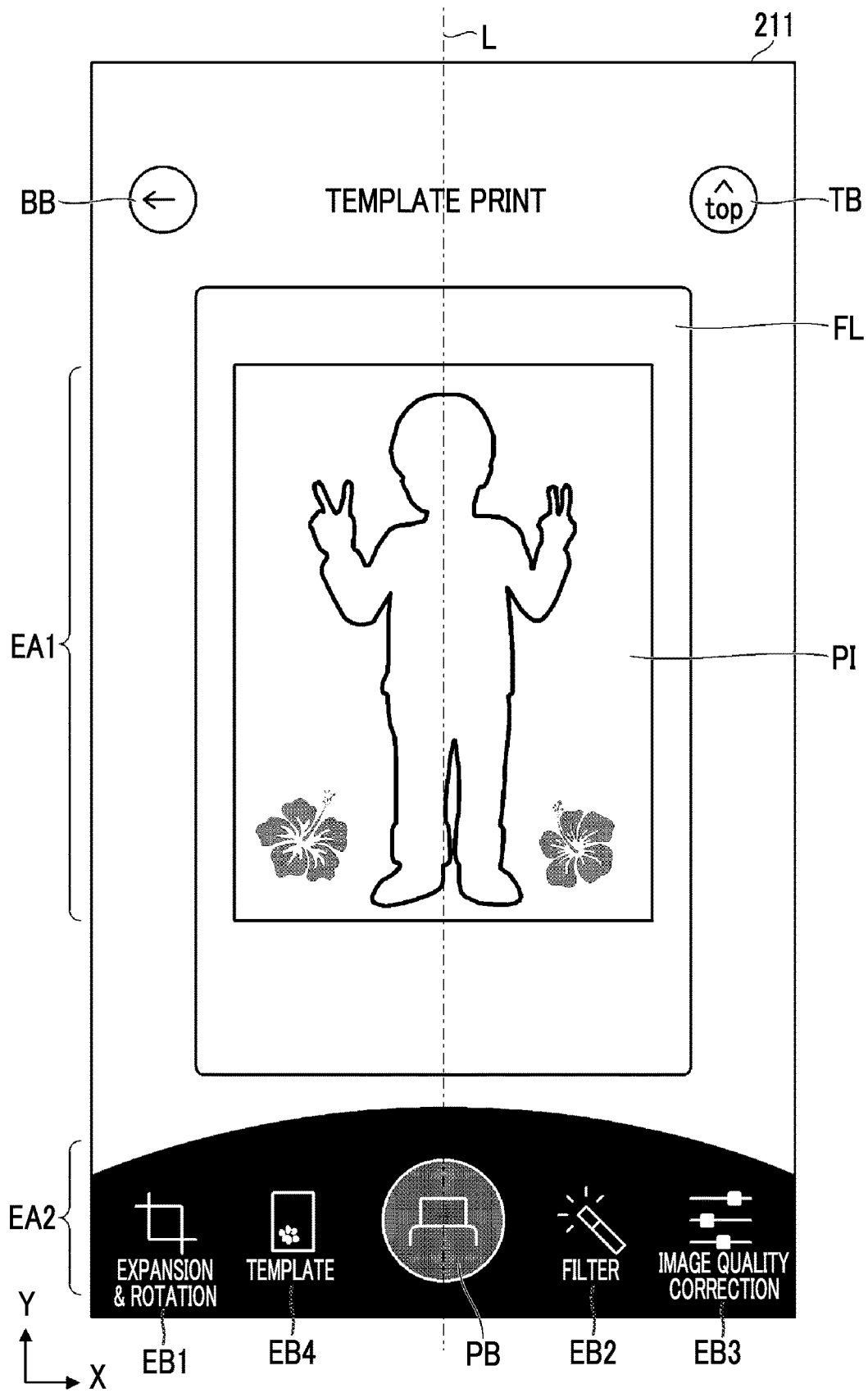
FIG. 20 is a view showing an example of a print image confirmation screen of template printing.

FIG. 20 is a view showing an example of the print image confirmation screen of template printing.

The screen configuration is the same as that of the print image confirmation screen 202 of simple printing, except that a template button EB4 is added as the image editing menu button. The template button EB4 is a button for calling a function of switching the template image. The template button EB4 is used in a case of changing the template image.

Similar to the print image confirmation screen 202 of simple printing, the print button PB and the image editing menu buttons (the expansion & rotation button EB1, the filter button EB2, the image quality correction button EB3, and the template button EB4) are displayed in the button display region EA2 while being arranged in a row along the width direction of the screen (X direction). In this case, the print button PB is disposed on the center line L and the image editing menu buttons (the expansion & rotation button EB1, the filter button EB2, the image quality correction button EB3, and the template button EB4) are arranged and displayed on both sides of the print button PB. Unlike the print image confirmation screen 202 of simple printing, the image editing menu buttons are arranged symmetrically with the print button PB as a center. Specifically, the expansion & rotation button EB1 and the template button EB4 are arranged at regular intervals on the left side of the print button PB, and the filter button EB2 and the image quality correction button EB3 are disposed at regular intervals on the right side of the print button PB. It is the same as the case of simple printing in that the print button PB at the center is formed in a larger size than other buttons (the expansion & rotation button EB1, the filter button EB2, the image quality correction button EB3, and the template button EB4).

[Template Switching Operation Screen]

Since the functions of expansion and rotation, the function of filter, and the function of image quality correction are the same as in the case of simple printing, a function of switching the template image will be described here.

In a case in which the template button EB4 is touched, the screen is switched to an operation screen (template switching operation screen) 212 for performing switching operation of the template image.

Figure 21:
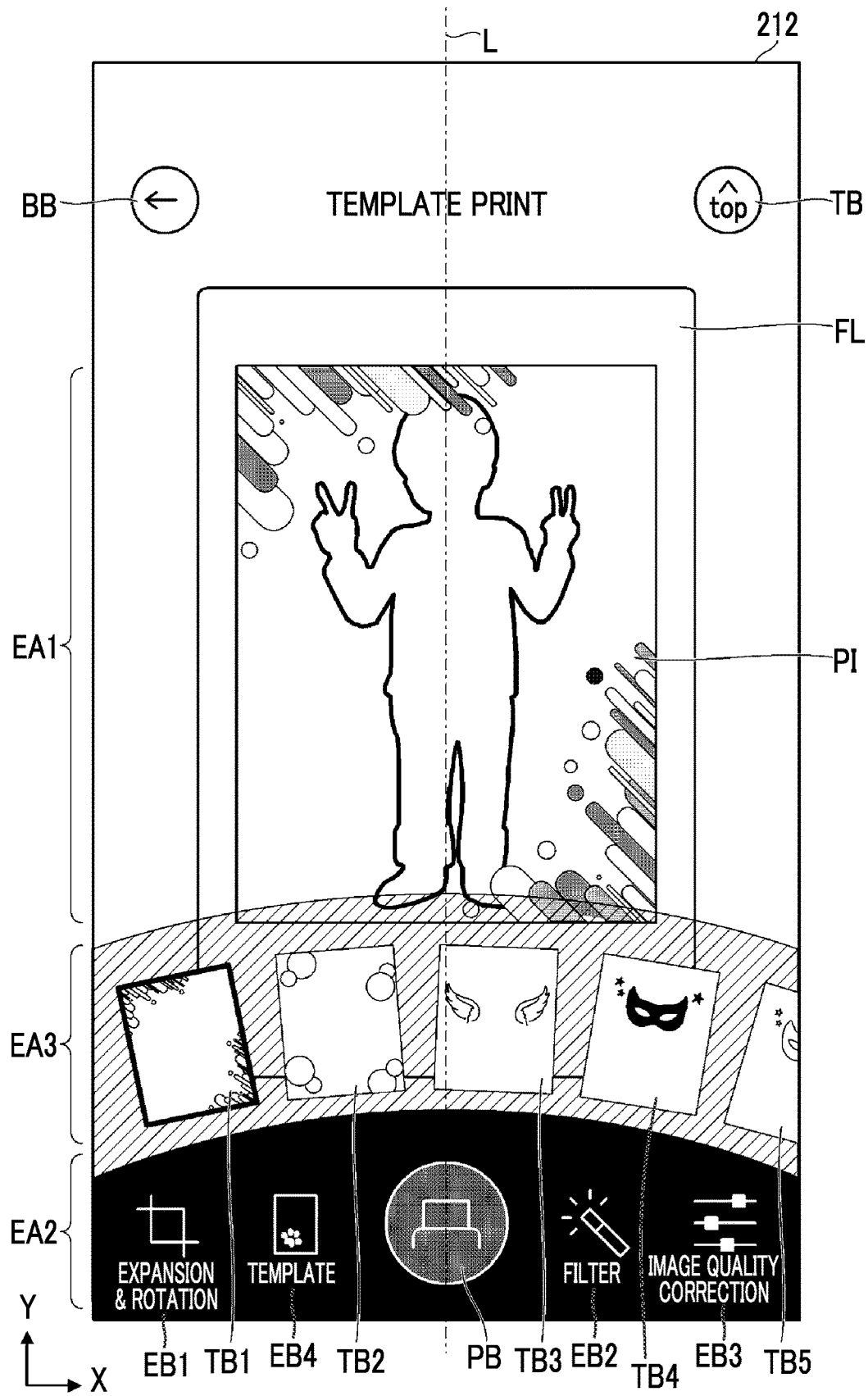
FIG. 21 is a view showing an example of a template switching operation screen.

FIG. 21 is a view showing an example of the template switching operation screen.

On the template switching operation screen 212, in addition to the display contents on the print image confirmation screen 202, selection buttons TB1, TB2, and the like of switchable template images are displayed. The user touches the selection button of the template image desired to be switched on the screen to select the template image to be switched. The selection buttons TB1, TB2, and the like are examples of the operation buttons for image editing.

Each button is formed by a reduced image of the template image selected by the button. Therefore, an outer shape of the selection button of the filter is similar to the outer shape of the print image PI (including a shape recognized to be almost similar).

Similar to the selection buttons of the filters, selection buttons TB1, TB2, and the like of the template images are expanded and displayed in the operation region EA3, and are displayed in a radial pattern around the point set on the center line L.

A certain number of the selection buttons TB1, TB2, and the like are displayed in the operation region EA3. FIG. 21 shows an example of a case in which four selection buttons are displayed at one time (a case in which the total number of buttons that can be displayed is four). Other selection buttons are displayed by scrolling. Scrolling is performed by performing the swipe operation or the flick operation on the screen on the selection button displayed in the operation region EA3. Here, the swipe operation is an operation of sliding a finger in a state of touching the screen. The flick operation is an operation of performing swipe more vigorously, flicking the screen, and sliding a finger away from the screen.

Figure 22:
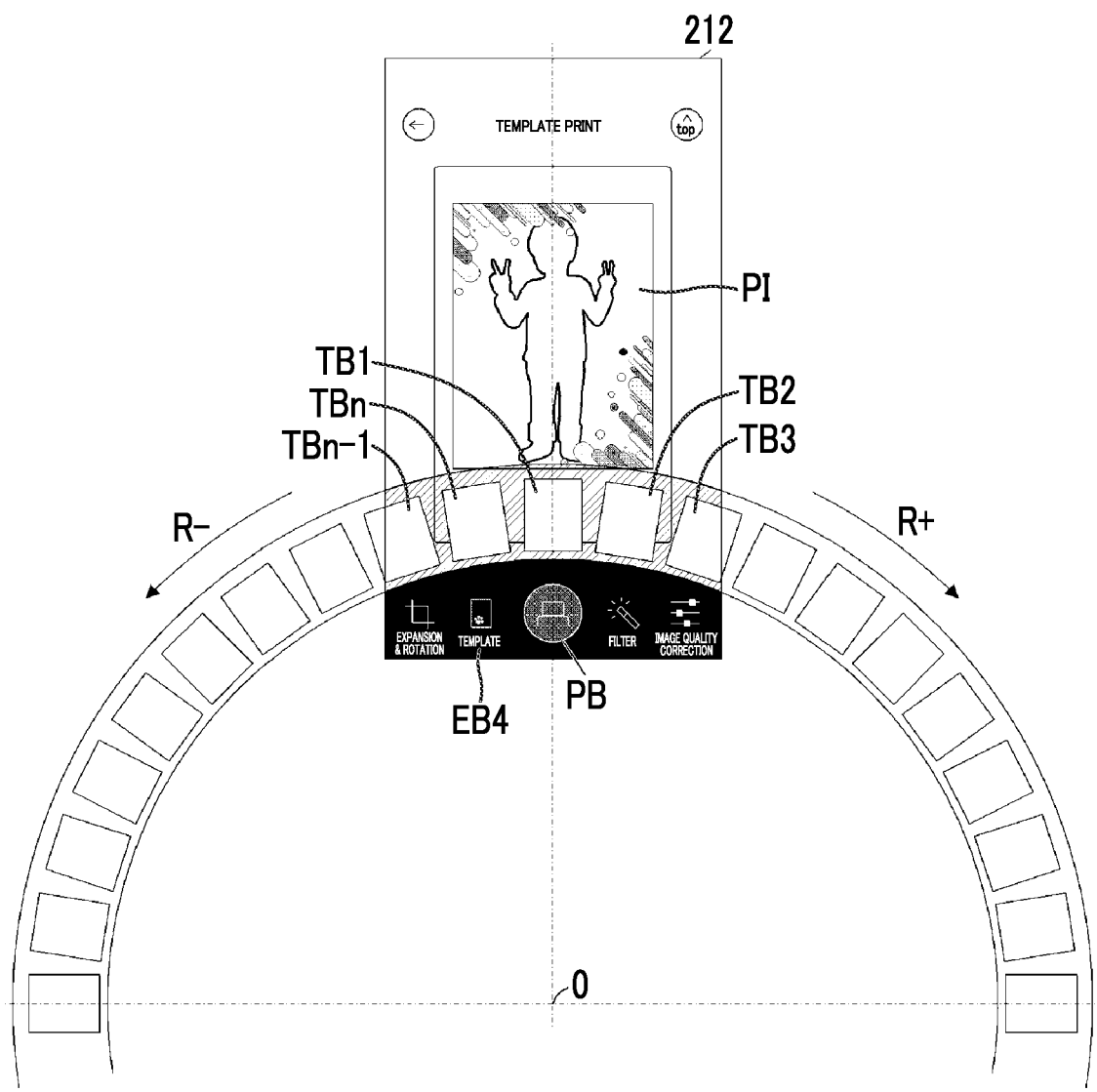
FIG. 22 is a conceptual diagram of scrolling of a selection button displayed in an operation region.

FIG. 22 is a conceptual diagram of scrolling of the selection button displayed in the operation region.

As shown in FIG. 22, the selection buttons TB1, TB2, and the like displayed in the operation region EA3 are scrolled in the right direction (direction of arrow R+) along the arc by performing the swipe operation or the flick operation on the screen to the right direction (scrolled clockwise). Further, the selection buttons TB1, TB2, and the like displayed in the operation region EA3 are scrolled in the left direction (direction of arrow R−) along the arc by performing the swipe operation or the flick operation on the screen to the left direction (scrolled counterclockwise).

[Operation Screen in Case in which Printing is Executed]

Execution of printing is the same as for the simple printing. That is, the print button PB is touched on the screen to instruct printing. In a case in which the instruction for printing is provided, the image data of the print image PI is transmitted to the printer 10. The point that the image of the image transmission is displayed as the animation is the same as in the case of simple printing (see FIG. 18).

(C) Print Operation Using Function of Collage Printing

Here, the configuration of the operation screen in a case in which the image is printed using the function of collage printing will be described.

As described above, the function of collage printing is a function of applying the image to each region of the frame (division frame) of which the inside is divided into a plurality of regions, generating the composite image (collage image), and printing the generated composite image. A rough operation procedure of collage printing is (1) selection of the division frame, (2) selection of the image to be composited, and (3) printing instruction. If necessary, the image to be composited is processed and edited.

[Division Frame Selection Screen]

In a case in which the collage print button MB5 is touched on the top screen 200, the function of collage printing is activated. In a case in which the function of collage printing is activated, the screen of the touch panel 120 is switched to a division frame selection screen 220. This screen is a screen for selecting the division frame.

Figure 23:
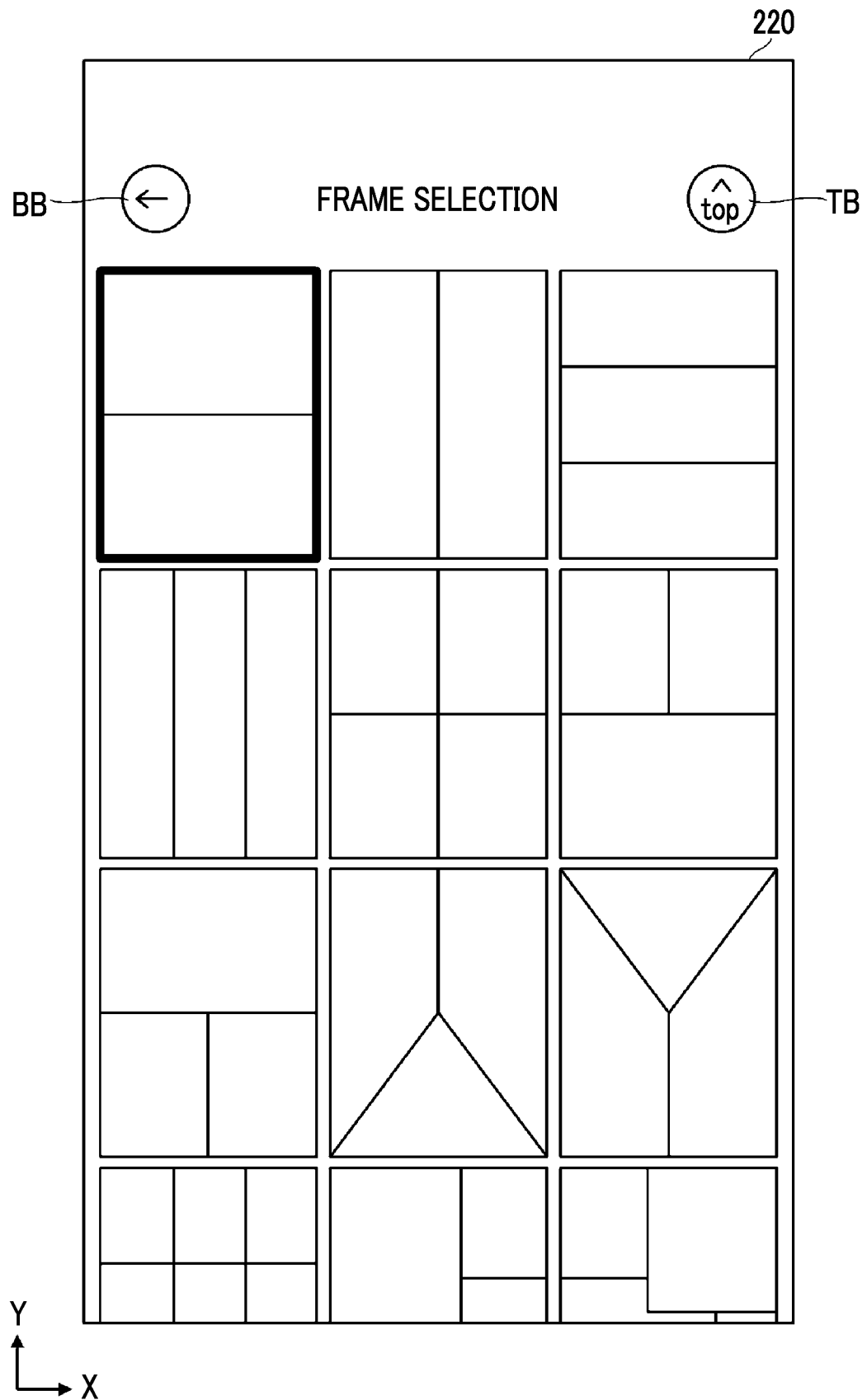
FIG. 23 is a view showing an example of a division frame selection screen.

FIG. 23 is a view showing an example of the division frame selection screen.

As shown in FIG. 23, selectable division frame images (images showing the mode of division within the frame) are displayed as a list on the division frame selection screen 220 in a thumbnail format. The user touches the image of the division frame of the divided pattern desired to be used on the screen and selects the division frame to be used.

[Collage Image Creation Screen]

In a case in which the division frame to be used is selected on the division frame selection screen 220, the screen of the touch panel 120 is switched to a collage image creation screen 221. This screen is a screen for creating the collage image.

Figure 24:
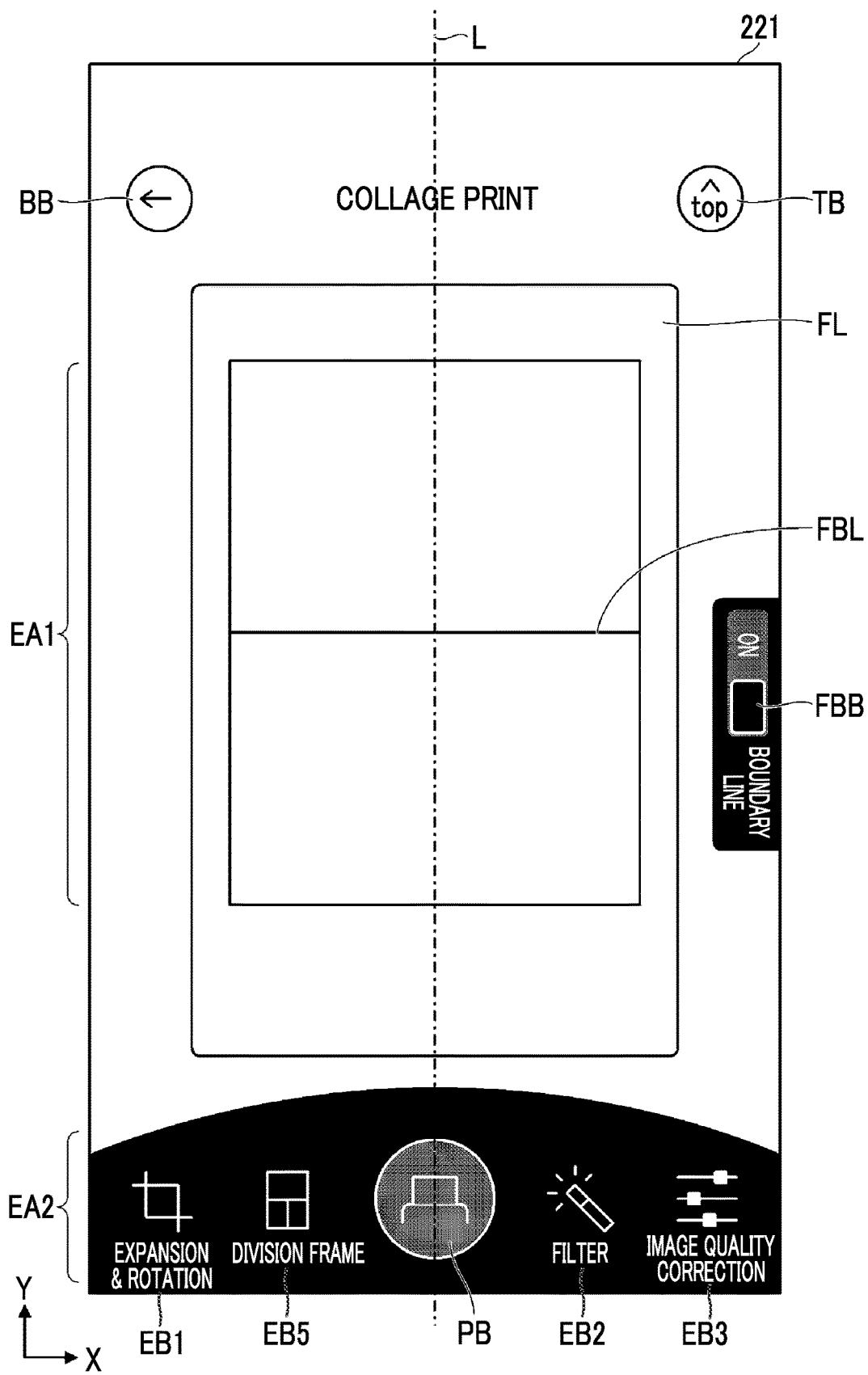
FIG. 24 is a view showing an example of a collage image creation screen.

FIG. 24 is a view showing an example of the collage image creation screen.

The screen configuration is the same as that of the print image confirmation screen 202 of simple printing except that the inside of the image display region EA1 is divided in accordance with the selected division frame, a boundary line button FBB for switching the display of a boundary line of division on and off is displayed, and a division frame button EB5 is added as the image editing menu button.

A region inside the image display region EA1 is divided in accordance with the selected division frame. The boundary line button FBB turns on and off the display of a boundary line FBL of the division. Each time the user touches the boundary line button FBB on the screen, the display is switched on and off. In a case in which the boundary line button FBB is turned on, the boundary line FBL is displayed in the image display region EA1. FIG. 24 shows a case in which the display of the boundary line FBL is turned on. In a case in which the display of the boundary line is turned on, the boundary line is also displayed on the image to be printed.

The division frame button EB5 is a button for calling a function of switching the division frame. The division frame button EB5 is used in a case of changing the division frame.

Similar to the print image confirmation screen 202 of simple printing, the print button PB and the image editing menu buttons (the expansion & rotation button EB1, the filter button EB2, the image quality correction button EB3, and the division frame button EB5) are displayed in the button display region EA2 while being arranged in a row along the width direction of the screen (X direction). In this case, the print button PB is disposed on the center line L and the image editing menu buttons (the expansion & rotation button EB1, the filter button EB2, the image quality correction button EB3, and the division frame button EB5) are arranged and displayed on both sides of the print button PB. Unlike the print image confirmation screen 202 of simple printing, the image editing menu buttons are arranged symmetrically with the print button PB as a center. Specifically, the expansion & rotation button EB1 and the division frame button EB5 are arranged at regular intervals on the left side of the print button PB, and the filter button EB2 and the image quality correction button EB3 are disposed at regular intervals on the right side of the print button PB. It is the same as the case of simple printing in that the print button PB at the center is formed in a larger size than other buttons (the expansion & rotation button EB1, the filter button EB2, the image quality correction button EB3, and the division frame button EB5).

In a case in which the region for compositing the images is touched in the image display region EA1, the screen of the touch panel 120 is switched to the image selection screen (see FIG. 13). The user selects the image to be composited on this screen. In a case in which the image is selected, the screen returns to the collage image creation screen 221 again. In this case, the selected image is applied to the selected region and displayed.

Figure 25:
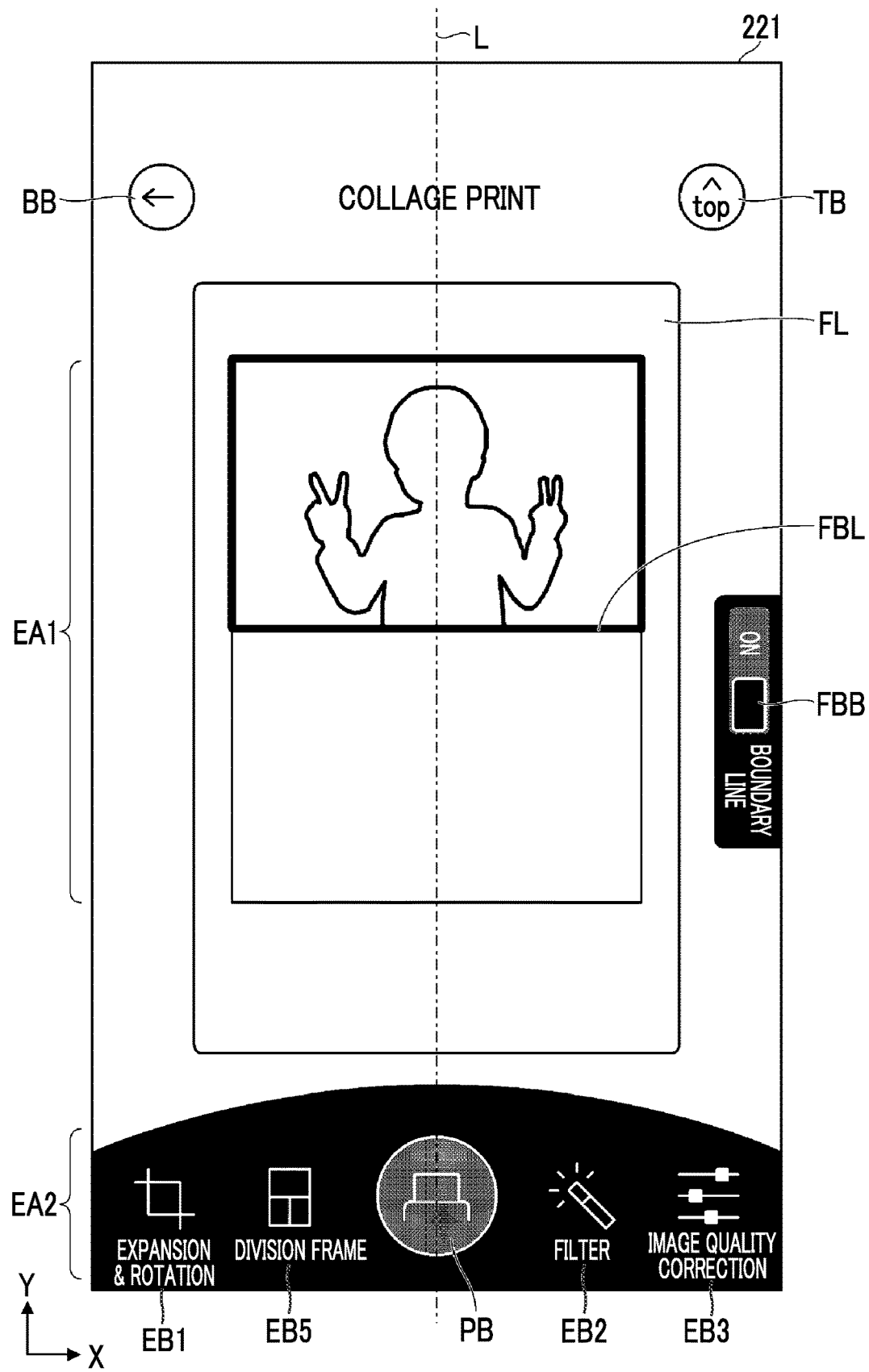
FIG. 25 is a view showing an example of the collage image creation screen after image selection.

FIG. 25 is a view showing an example of the collage image creation screen after image selection.

FIG. 25 shows an example of the screen display in a case in which in the division frame of which the inside of the frame is divided into upper and lower halves, the upper region of the screen is selected, and the image to be composited is selected. As shown in FIG. 25, the selected image is applied to the selected region and displayed.

In a case in which a finger is moved while touching the image in the selected region, the position of the image is adjusted. In a case of changing the selected image, the region in which the image is to be changed is touched and selected, and then the back button BB is touched. By the above operation, the screen is switched to the image selection screen (see FIG. 13), and the image can be selected. By performing the flick operation on the screen in the region, the images may be switched sequentially.

The images are selected for all regions of the division frame to complete the collage image.

[Division Frame Switching Operation Screen]

The image of each selected region can be individually processed and edited by using the functions of expansion and rotation, the function of filter, and the function of image quality correction. The functions of expansion and rotation, the function of filter, and the function of image quality correction are the same as in the case of simple printing. Here, a function of switching the division frame will be described.

In a case in which the division frame button EB5 is touched, the screen is switched to an operation screen (division frame switching operation screen) 222 for performing switching operation of the division frame.

Figure 26:
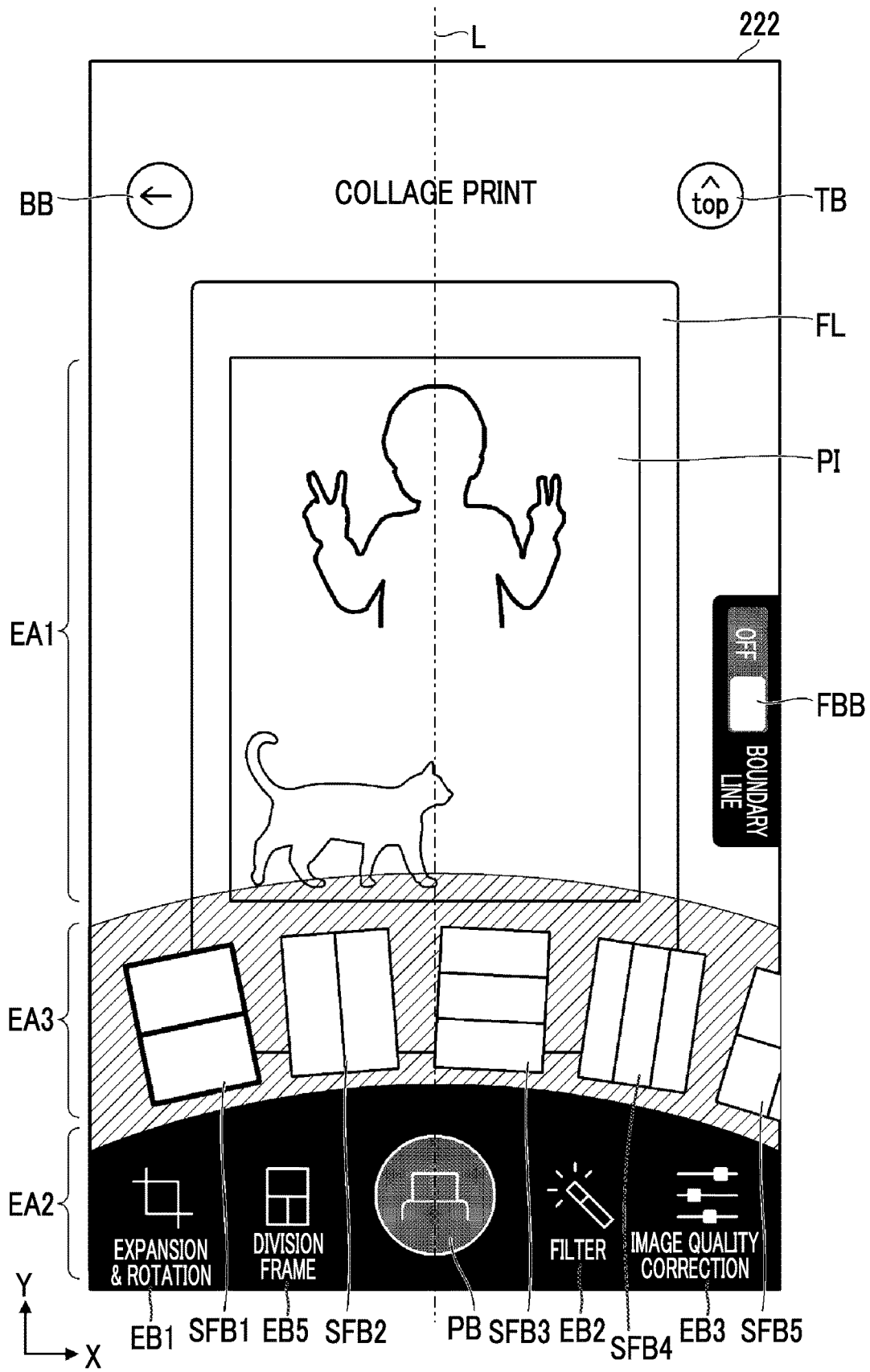
FIG. 26 is a view showing an example of a division frame switching operation screen.

FIG. 26 is a view showing an example of the division frame switching operation screen.

On the division frame switching operation screen 222, in addition to the display contents on the collage image creation screen 221, division frame selection buttons SFB1, SFB2, and the like for selecting switchable division frames are displayed. The user touches the selection button of the division frame desired to be switched on the screen to select the division frame to be switched. The division frame selection buttons SFB1, SFB2, and the like are examples of the operation buttons for image editing.

Each button is formed by a reduced image of the division frame image selected by the button. Therefore, the outer shape of the selection button of the filter is similar to the outer shape of the print image (including a shape recognized to be almost similar).

The division frame selection buttons SFB1, SFB2, and the like are displayed in the operation region EA3 and are displayed in a radial pattern around the point set on the center line L, similarly to the selection buttons of the template image. Further, in the operation region EA3, a certain number of division frame selection buttons SFB1, SFB2, and the like are displayed. The other division frame selection buttons are displayed by scrolling in the same manner as the template image selection buttons (see FIG. 22).

In a case in which the division frame is switched, the image of each region is selected again.

[Operation Screen in Case in which Printing is Executed]

In a case in which the collage image is completed, it can be printed. Execution of printing is the same as for the simple printing. That is, the print button PB is touched on the screen to instruct printing. In a case in which the instruction for printing is provided, the image data of the print image (generated collage image) is transmitted to the printer 10. The point that the image of the image transmission is displayed as the animation is the same as in the case of simple printing (see FIG. 18).

MODIFICATION EXAMPLE

Modification Example of Printing Instruction Operation

In the embodiment described above, the print button PB displayed in the button display region EA2 is touch-operated to instruct printing of the image displayed in the image display region EA1. The instruction for printing may be provided by the following method instead of or in addition to the above method. That is, the instruction for printing is provided by performing the swipe operation or the flick operation on the screen on the print image PI displayed in the image display region EA1 or on the frame FL.

Figure 27:
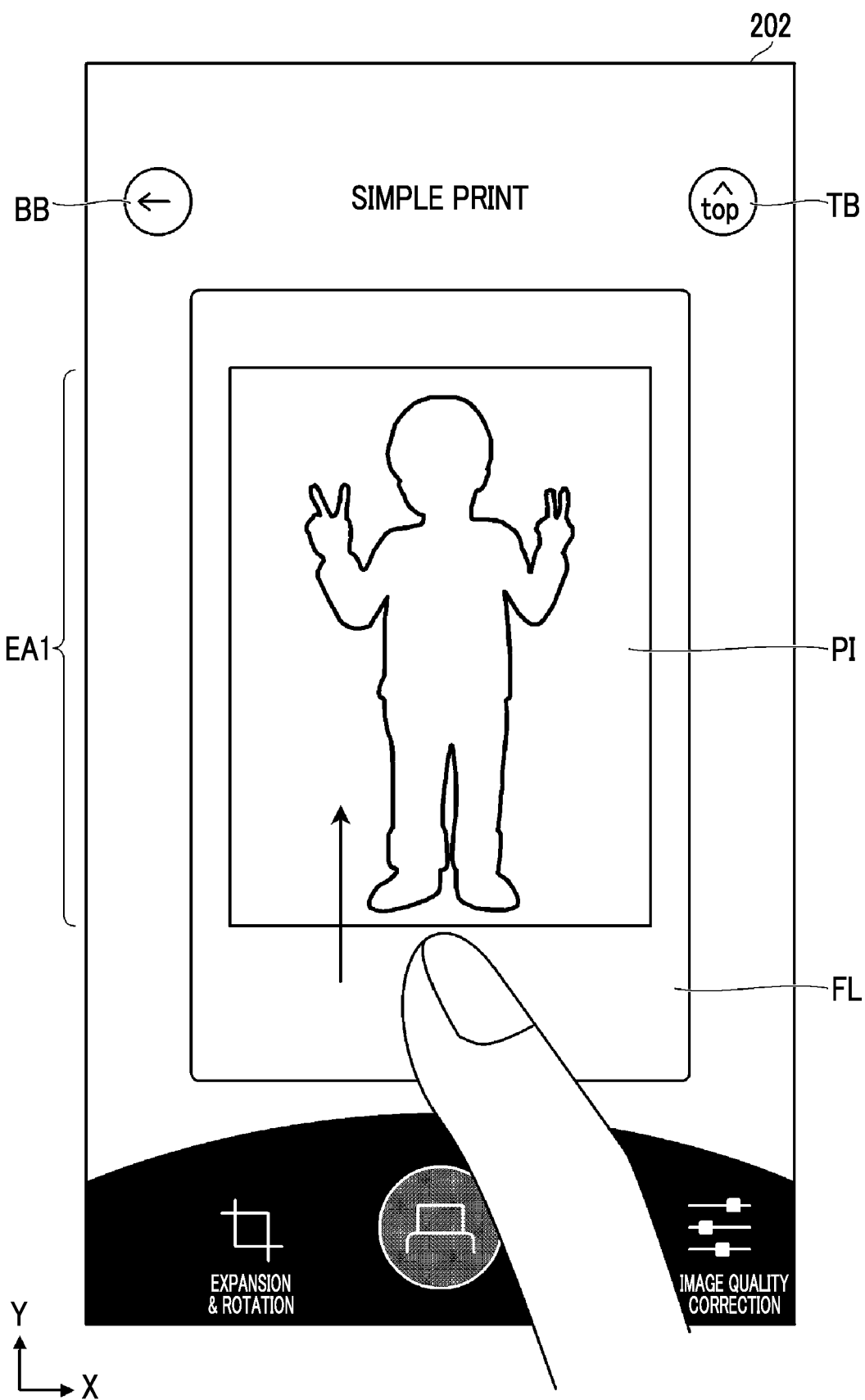
FIG. 27 is a conceptual diagram of an operation in a case in which the instruction for printing is provided by a flick operation.

FIG. 27 is a conceptual diagram of an operation in a case in which the instruction for printing is provided by the flick operation.

As shown in FIG. 27, the frame FL displayed on the screen is touched with a finger, flicked, and slid upward to instruct printing.

As described above, in a case in which the instruction for printing is provided, the image of the image transmission is displayed by the animation. A movement direction of the print image PI in a case of animation display matches an operation direction of the printing instruction. As a result, intuitive operation can be made and the operability can be further improved.

[Cancel of Printing]

It is preferable that printing can be cancelled if necessary. In particular, the convenience of the print system can be further improved by enabling printing to be cancelled before printing is started.

As a method of instructing the portable terminal to cancel printing, a method of displaying a button for providing the instruction for cancellation of printing on the screen can be adopted.

Figure 28:
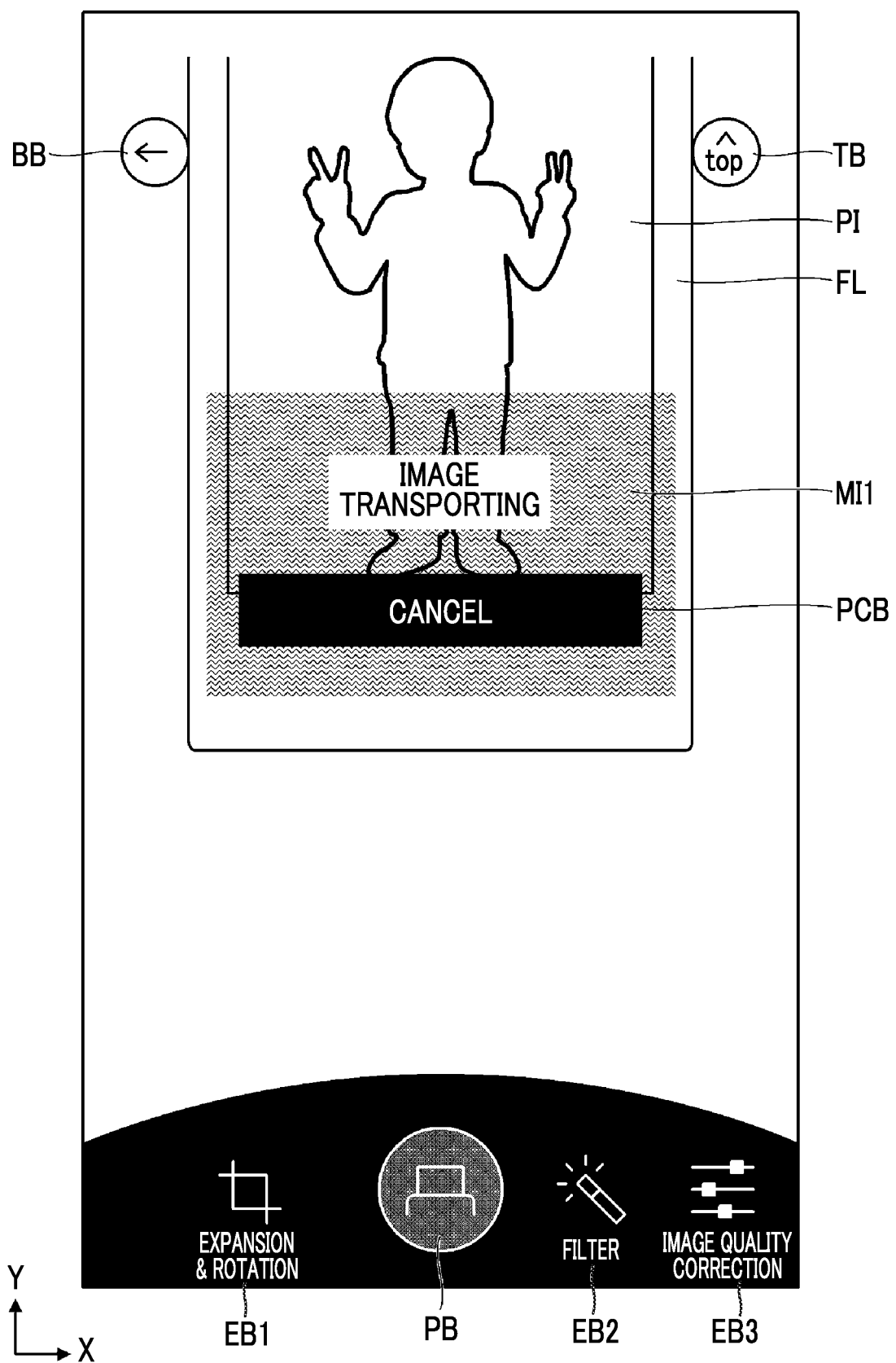
FIG. 28 is a view showing an example of a screen that receives a printing cancellation instruction input.

FIG. 28 is a view showing an example of a screen that receives a printing cancellation instruction input. FIG. 28 shows an example of the screen in a case in which printing cancellation instruction input is received during the image transmission.

As described above, in a case in which the instruction for printing is provided, the image of the image transmission is displayed by the animation. A message MI1 ("during image transmission") indicating that the image is being transmitted and a print cancel button PCB are displayed on the print image PI in a case of the animation display. The print cancel button PCB is a button for providing the instruction for cancellation of printing. The print cancel button PCB is configured by a button with a text of cancel within a rectangular frame.

The message MI1 and the print cancel button PCB are moved together with the print image PI in a case of the animation display. Therefore, the message MI1 eventually disappears from the upper edge of the screen. By touching the print cancel button PCB during display, printing is cancelled.

In a case in which the print cancel button PCB is touched after the instruction for printing is provided, and printing is cancelled, the print image PI is moved in a backward direction and returns to the original position. That is, the printed image PI is moved downward and returns to the position before the start of movement (see screen 206A in FIG. 18).

By displaying the print cancel button PCB in this way, printing can be cancelled, the time limit thereof can be grasped, and the operability can be further improved.

Modification Example of Operation Method of Image Processing on Screen

The operations of expansion and rotation of the image to be printed may be performed by a predetermined gesture. For example, by performing pinch-out and pinch-in operations on the image displayed in the image display region EA1, the image is expanded and reduced. Further, by performing the swipe operation on the image displayed in the image display region EA1, the image is moved in the operation direction. Further, in a case in which the image displayed in the image display region EA1 is touched with two fingers (for example, the thumb and the index finger) and rotated (twisted), the image is rotated. The pinch-in operation refers to an operation of touching, pinching, and moving the screen with two fingers (for example, the thumb and the index finger). The pinch-out operation is an operation of touching, expanding, and moving the screen two fingers (for example, the thumb and the index finger).

In a case in which performing operations of expansion, movement, and rotation with a gesture on the screen in this way, it is preferable to have a configuration in which the function can be switched on and off. For example, a configuration can be adopted in which the function is switched on and off by touching the frame FL that surrounds the print image PI. In this case, the function is switched on and off alternately each time the frame FL is touched.

Further, in a case in which performing operations of expansion, movement, and rotation with a gesture on the screen in this way, it is preferable to display an operation guide screen.

Figure 29:
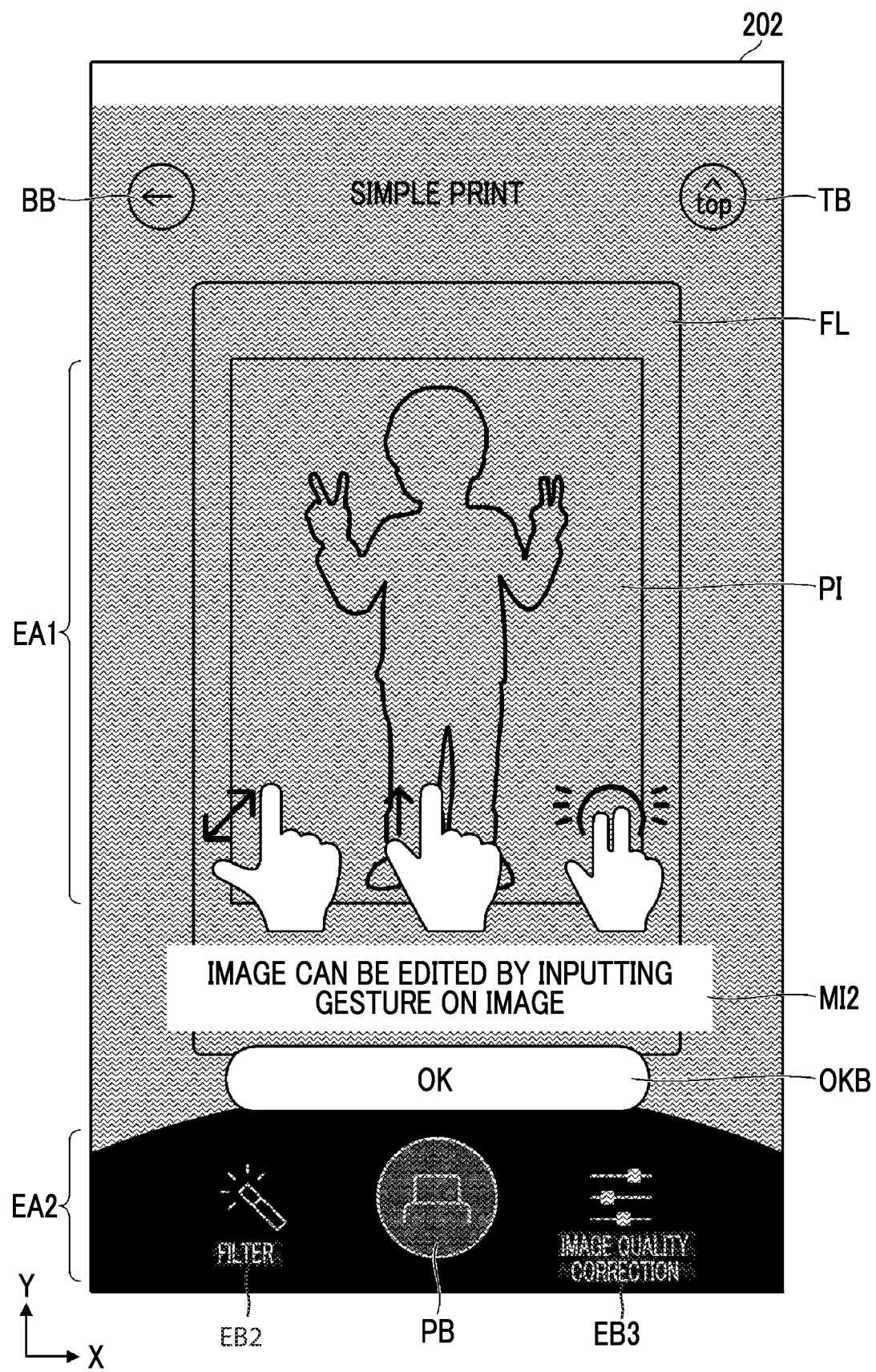
FIG. 29 is a view showing an example of an operation guide screen.

FIG. 29 is a view showing an example of the operation guide screen.

As shown in FIG. 29, a message ("image can be edited by inputting gesture on image") MI2 indicating that the image can be expanded, moved, and rotated by a gesture on the screen is displayed on the print image confirmation screen 202. This message MI2 is displayed, for example, in a case in which the print image confirmation screen 202 is first displayed.

In the example shown in FIG. 29, an OK button OKB is displayed in order to prompt the user for confirmation. The message MI2 disappears from the screen by touching the OK button OKB. It is preferable that the display and non-display of the message MI2 can be selected in the setting.

Further, in a case in which the image is expanded and rotated by a gesture on the screen as in this example, the display of the button (the expansion & rotation button EB1) for calling the functions of expansion and rotation can be omitted. FIG. 29 shows the example in which the display of the expansion & rotation button is omitted.

Modification Example of Button Layout

In the embodiment described above, the print button PB is disposed on the center line L in the button display region EA2, but the type of the button disposed on the center line L is not limited to this. Buttons for other functions may be disposed.

However, on the operation screen for performing operations related to printing, the printing instruction operation can be clarified by disposing the print button PB on the center line and displaying the print button PB in a size larger than that of the other buttons.

Further, in the embodiment described above, only the print button PB and the image editing menu button are displayed in the button display region EA2, but buttons of other functions may be displayed in the button display region EA2. For example, the setting button SEB may be displayed.

Modification Example of Image Editing Menu

In the embodiment described above, as an example, the case has been described in which as the image editing menu, the functions of expansion and rotation, the function of filter, and the function of image quality correction are provided, but the items to be prepared as the image editing menu are not limited to these. Other image editing may be performed instead of or in addition to the above items. For example, noise removal, sharpness change, and the like may be performed.

In addition, the touch panel may be used to write a text on the image, draw a picture, and press a stamp (so-called drawing mode). Further, a keyboard may be displayed on the screen to imprint the input text. For example, the text may be imprinted in a margin region.

[Operation Screen in Case in which Printer is not Connected]

In a case in which the printer 10 is not connected (communication with the printer 10 is not established), a communication connection button may be displayed instead of the displayed print button on each operation screen.

Figure 30:
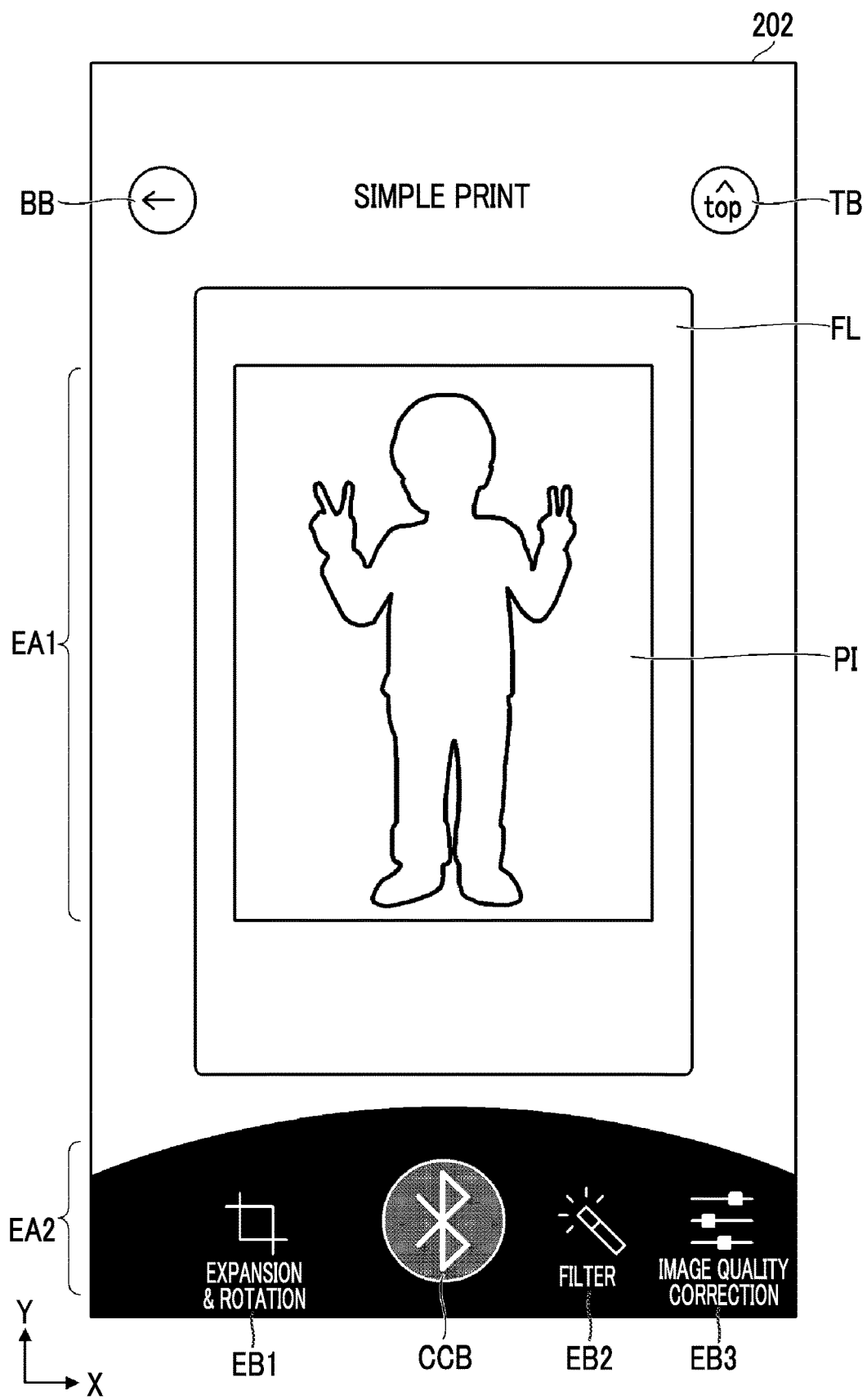
FIG. 30 is a view showing an example of display of a communication connection button.

FIG. 30 is a view showing an example of display of the communication connection button. FIG. 30 shows the example of the case in which the communication connection button is displayed on the operation screen for the function of simple printing.

As shown in FIG. 30, a communication connection button CCB is displayed instead of the print button. The communication connection button CCB is a button for performing a communication connection with the printer 10. In a case in which the communication connection button CCB is touched, processing of detecting the printer 10 capable of communicating is performed, and processing of establishing the communication with the detected printer 10 is performed. In this case, the touch panel 120 of the smartphone 100 displays a screen for setting the communication. For example, communicable printers are displayed as a list, and a screen for selecting the printer to be connected is displayed.

[Operation Screen for Function of Instant Camera]

Figure 31:
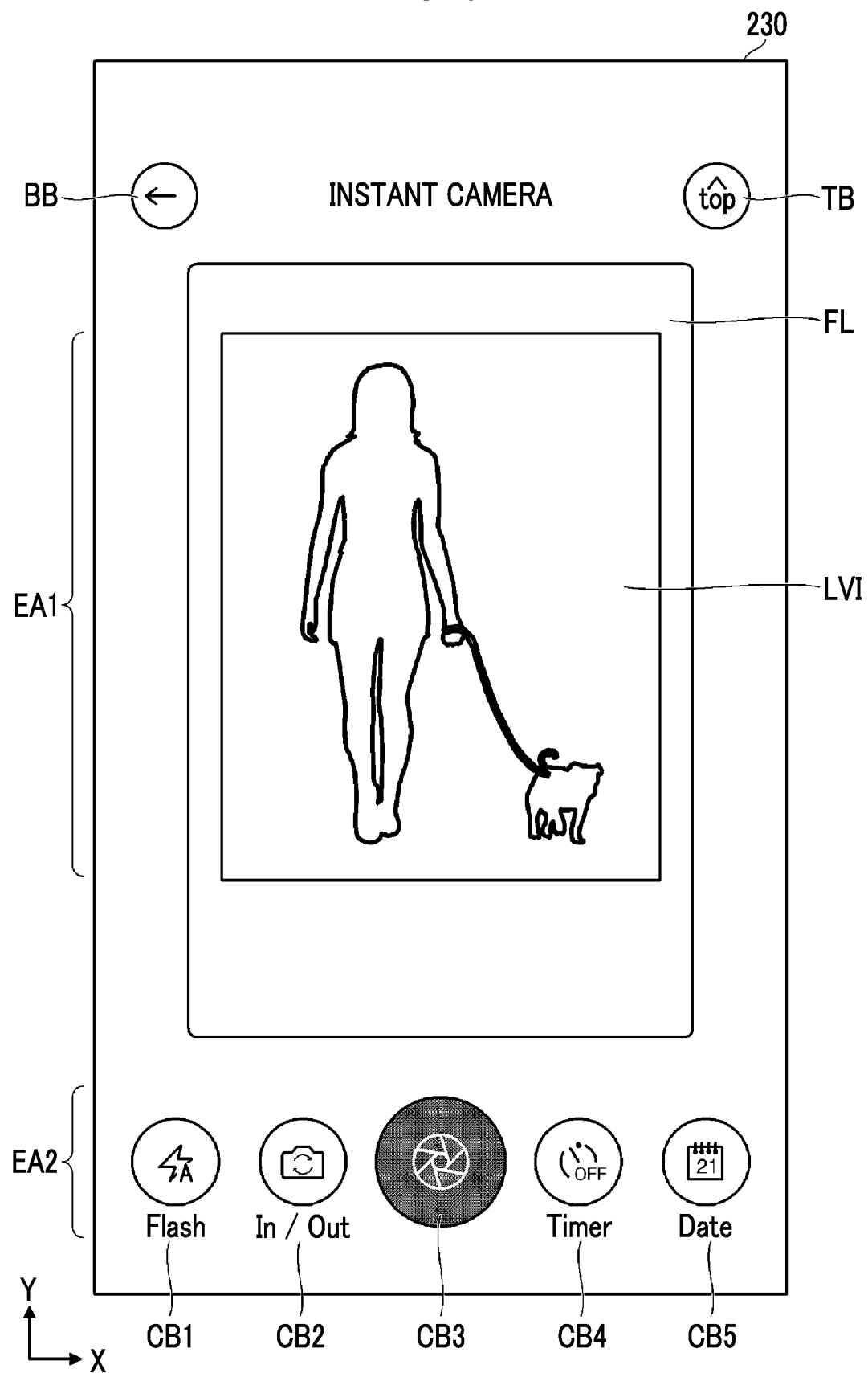
FIG. 31 is a view showing an example of an operation screen for function of an instant camera.

FIG. 31 is a view showing an example of an operation screen for the function of the instant camera.

On an operation screen 230 for the function of the instant camera, a live view image LVI is displayed in the image display region EA1. Live view is a function of displaying the motion picture captured by the image sensor in real time.

Further, on the operation screen 230 for the function of the instant camera, the operation buttons of the camera are displayed in the button display region EA2. Specifically, a flash button CB1, an in-and-out switching button CB2, a shutter button CB3, a timer button CB4, and a date button CB5 are displayed. The flash button CB1 is a button for switching a flash mode. The in-and-out switching button CB2 is a button for switching between the in-camera and the out-camera. The shutter button CB3 is a button for providing an instruction for a release. The timer button CB4 is a button for switching a timer function on and off. The date button CB5 is a button for switching a date function on and off. The date function is a function of imprinting the date on a predetermined position of the print image.

The operation buttons of the camera are arranged symmetrically with the shutter button CB3 as a center. The shutter button CB3 is disposed at the center of the screen in the width direction. Further, the shutter button CB3 is formed in a larger size than other buttons.

Other Examples of Printer

In the embodiment described above, as an example, the case has been described in which the printer is configured by the instant printer, but the configuration of the printer is not limited to this. In addition, the present invention can be applied to various types of printers such as a thermal printer that performs printing on thermal paper, a thermal transfer printer that performs printing using an ink ribbon, and an inkjet printer that performs printing by an inkjet method. Further, the type of medium used is not particularly limited, and it can be applied to a printer that performs printing on roll paper as well as sheet paper. Further, it can be applied to a printer that performs printing on a label (including a sticker) or the like.

Further, in the embodiment described above, as an example, the case has been described in which the present invention is applied to a mobile printer, but the application of the present invention is not limited to this. It can also be applied to a so-called stationary type printer.

Other Examples of Operation Device

In the embodiment described above, as an example, the case has been described in which the portable terminal is used as the operation device, but the device that can be used as the operation device is not limited to this. Any device (particularly a mobile device) comprising the touch panel that detects the touch operation on the screen, the display control unit (CPU or the like) that controls the display of the touch panel, and the communication unit can be used as the operation device. Therefore, for example, a digital camera or the like having a short range wireless communication function and the display unit having the touch panel can be used as the operation device. Also, a portable game machine or the like having these functions can also be used as the operation device.

Also, the hardware that realizes the functions of the display control unit and the like can be configured by various processors. The various processors include the central processing unit (CPU) that is a general-purpose processor executing the program and functioning as the various processing units, a programmable logic device (PLD) that is a processor whose circuit configuration can be changed after manufacture, such as a field programmable gate array (FPGA), and a dedicated electric circuit that is a processor having a circuit configuration that is designed for exclusive use in order to execute specific processing, such as an application specific integrated circuit (ASIC). One processing unit configuring the operation device may be configured by one of these various processors or may be configured by two or more processors of the same type or different types. For example, one processing unit may be configured by a plurality of FPGAs or a combination of the CPU and the FPGA. Alternatively, a plurality of processing units may be configured by one processor. As an example of configuring a plurality of processing units with one processor, first, as represented by a computer such as a client computer or a server, there is a form in which one processor is configured by a combination of one or more CPUs and the software and the processor functions as a plurality of processing units. Second, as represented by a system on chip (SoC), there is a form in which a processor is used in which the functions of the entire system including a plurality of processing units are realized by a single integrated circuit (IC) chip. As described above, the various processing units are configured by one or more of the above various processors as a hardware structure. Further, the hardware structure of these various processors is, more specifically, an electric circuit (circuitry) in which the circuit elements such as semiconductor elements are combined.

Modification Example of Communication Mode

In the embodiment described above, the printer and the portable terminal communicate with each other wirelessly, but the printer and the portable terminal may also communicate with each other by wire. Also, in the case of wireless communication, the communication method is not particularly limited, and a known communication method can be adopted.

[Use as Remote Controller]

In a case in which the printer and the portable terminal communicate with each other wirelessly, the printer may be used as a remote controller of the portable terminal. For example, in a case in which the portable terminal has a camera function as in the smartphone of the embodiment described above, a mode in which the camera function is remotely operated by the printer can be considered. In this case, for example, the power button 16 provided in the printer body 14 can function as the shutter button. Further, in a case in which the printer 10 of the embodiment described above has a function of detecting the motion of the printer body 14, a configuration may be adopted in which the motion of the printer body 14 is detected, and a specific function of the portable terminal is remotely operated by a specific motion of the printer body 14. For example, a configuration can be adopted in which the zoom of the camera provided in the portable terminal is controlled by back and forth tilting motions of the printer body 14 (zooming up by the forth tilting motion of the printer body 14, zooming down by the back tilting motion thereof, and the like).

EXPLANATION OF REFERENCES

10: printer
12: instant film
12*a*: exposure surface of instant film
12*b*: observation surface of instant film
12*c*: exposure region of instant film
12*d*: pod portion of instant film
12*e*: development treatment liquid pod of instant film
12*f*: trap portion of instant film
12*g*: absorbing material of instant film
12*h*: observation region of instant film
12*i*: frame of observation surface of instant film
14: printer body
16: power button
18: discharge port
20: film pack lid
22: lock release lever
24: USB cable connected part cover
30: film pack loading chamber
32: film feeding mechanism
32*a*: claw
34: film transport mechanism
34A: transport roller pair
34B: spreading roller pair
36: print head
40: film pack
42: case of film pack
42*a*: opening for exposure of case
42*b*: film discharge port of case
42*c*: claw opening portion of case
50: operation detection unit
52: light source unit
54: light source control unit
56: wireless communication unit
56A: antenna
58: power supply unit
60: power supply control unit
62: printer built-in memory
64: memory control unit
66: motion detection unit
68: film feeding mechanism driving unit
70: film transport mechanism driving unit
72: print head control unit
80: printer microcomputer
80A: image acquisition unit
80B: print data generation unit
80C: print control unit
80D: representative color detection unit
80E: light emission control unit
100: portable terminal
100A: display control unit
100B: input control unit
100C: imaging control unit
100D: reproduction control unit 100E: image processing unit
100F: communication control unit
101: CPU
102: ROM
103: RAM
104: built-in memory
105: display
106: touch pad
107: GPS reception unit
108A: in-camera unit
108B: out-camera unit
109: microphone unit
110: speaker unit
111: wireless communication unit
111A: antenna
112: short range wireless communication unit
112A: antenna
113: sensor unit
114: media drive
115: memory card
120: touch panel
200: top screen
201: image selection screen
201A: cancel button
202: print image confirmation screen
203: expansion & rotation operation screen
204: filter operation screen
205: image quality correction operation screen
206A: one screen of animation in case in which instruction for printing is provided
206B: one screen of animation in case in which instruction for printing is provided
206C: one screen of animation in case in which instruction for printing is provided
210: template selection screen
212: template switching operation screen
220: division frame selection screen
221: collage image creation screen
222: division frame switching operation screen
230: operation screen for function of instant camera
BB: back button
CB1: flash button
CB2: in-and-out switching button
CB3: shutter button
CB4: timer button
CB5: date button
CCB: communication connection button
EA1: image display region
EA2: button display region
EA3: operation region
EB1: rotation button
EB2: filter button
EB3: image quality correction button
EB4: template button
EB5: division frame button
F: feeding direction of instant film
FB1: normal button
FB2: monochrome button
FB3: sepia button
FB4: auto button
FBB: boundary line button
FBL: boundary line
FL: frame that surrounds image display region
L: center line of screen in width direction
LVI: live view image
MA1: first group display region
MA2: second group display region
MA3: printer information display region
MB1: simple print button
MB2: movie print button
MB3: instant camera button
MB4: template print button
MB5: collage print button
MB6: chemistry diagnosis button
MB7: collage-with-everyone button
MG1: first group
MG2: second group
MI1: message
MI2: message
NB1: knob of slide bar for expansion
NB2: knob of slide bar for rotation
NB3: knob of slide bar for brightness adjustment
NB4: knob of slide bar for contrast adjustment
NB5: knob of slide bar for chroma saturation adjustment
OKB: OK button
PB: print button
PI: print image
R+: scroll direction
R−: scroll direction
RSB: reset button
SB1: slide bar for expansion
SB2: slide bar for rotation
SB3: slide bar for brightness adjustment
SB4: slide bar for contrast adjustment
SB5: slide bar for chroma saturation adjustment
SEB: setting button
SFB1, SFB2, and the like: division frame selection button
TB: top button
TB1, TB2, and the like: selection button of template image

What is claimed is:

1. An operation device comprising:
a touch panel that detects a touch operation on a screen; and
a processor configured to function as a display control unit that controls a display of the touch panel,
wherein the display control unit
displays an image in an image display region set on a center line passing through a center of the screen, the center line extending in a vertical direction,
displays a plurality of buttons including a print button for providing an instruction for printing of the image displayed in the image display region, an image quality correction button, and a template button side by side along a width direction of the screen,
displays the print button positioned on the center line in a larger size than other buttons of the plurality of buttons,
in a case in which the image quality correction button is selected, displays a slide bar for image editing and a reset button in a region between a region in which the plurality of buttons are displayed and the image display region, wherein the slide bar changes a parameter of the image in accordance with an amount of operation thereof and the reset button resets operation of the slide bar to a default position in accordance with selection thereof,
in a case in which the template button is selected, displays a plurality of selectable template images that can be applied to the image in the image display region, between the region in which the plurality of buttons are displayed and the image display region, wherein the selectable template images are displayed by scrolling, displays the region between the region in which the plurality of buttons are displayed and the image display region in a radial pattern around a point set on the center line, and displays a frame that surrounds the image displayed in the image display region and has a same margin as a printed article, wherein the processor is further configured to receive a printing instruction in response to a swipe operation or a flick operation on the image displayed in the image display region or the frame, and only the selectable template images, or the slide bar and reset button, are displayed at any one time.

2. The operation device according to claim 1,
wherein in case in which an instruction for printing of the image displayed in the image display region is provided, the display control unit moves the image displayed in the image display region along a direction orthogonal to the width direction of the screen to disappear from the screen.

3. The operation device according to claim 1,
wherein the display control unit displays a cancel button for providing an instruction for cancellation of printing while moving the image displayed in the image display region on the screen.

4. The operation device according to claim 1,
wherein the touch panel has a rectangular-shaped screen, and a direction of a short side of the screen is the width direction.

5. The operation device according to claim 1,
wherein the processor is further configured to function as:
a communication unit that communicates with a printer; and
a transmission control unit that transmits, in a case in which an instruction for printing of the image displayed in the image display region is provided, image data to the printer via the communication unit.

6. The operation device according to claim 5,
wherein the printer prints the image on an instant film.

7. An operation device comprising:
a touch panel that detects a touch operation on a screen; and
a processor configured to function as a display control unit that controls a display of the touch panel,
wherein the display control unit
displays an image in an image display region set on a center line passing through a center of the screen, the center line extending in a vertical direction,
displays a plurality of buttons including a print button for providing an instruction for printing of the image displayed in the image display region, an image quality correction button, and a template button side by side along a width direction of the screen,
displays the print button positioned on the center line in a larger size than other buttons of the plurality of buttons,
in a case in which the image quality correction button is selected, displays a slide bar for image editing along a circle around a point set on the center line and a reset button in a region between a region in which the plurality of buttons are displayed and the image display region, wherein the slide bar changes a parameter of the image in accordance with an amount of operation thereof and the reset button resets operation of the slide bar to a default position in accordance with selection thereof, in a case in which the template button is selected, displays a plurality of selectable template images that can be applied to the image in the image display region, between the region in which the plurality of buttons are displayed and the image display region, wherein the selectable template images are displayed by scrolling, and displays a frame that surrounds the image displayed in the image display region and has a same margin as a printed article, wherein the processor is further configured to receive a printing instruction in response to a swipe operation or a flick operation on the image displayed in the image display region or the frame, and only the selectable template images, or the slide bar and reset button, are displayed at any one time.

8. The operation device according to claim 7,
wherein in a case in which an instruction for printing of the image displayed in the image display region is provided, the display control unit moves the image displayed in the image display region along a direction orthogonal to the width direction of the screen to disappear from the screen.

9. The operation device according to claim 7,
wherein the display control unit displays a cancel button for providing an instruction for cancellation of printing while moving the image displayed in the image display region on the screen.

10. The operation device according to claim 7,
wherein the touch panel has a rectangular-shaped screen, and a direction of a short side of the screen is the width direction.

11. The operation device according to claim 7,
wherein the processor is further configured to function as:
a communication unit that communicates with a printer; and
a transmission control unit that transmits, in a case in which an instruction for printing of the image displayed in the image display region is provided, image data to the printer via the communication unit.

12. The operation device according to claim 11,
wherein the printer prints the image on an instant film.

13. A non-transitory computer readable recording medium storing a display control program that causes a computer to realize a function of controlling a display of a touch panel that detects a touch operation on a screen, the function comprising:
displaying an image in an image display region set on a center line passing through a center of the screen, the center line extending in a vertical direction,
displaying a plurality of buttons including a print button for providing an instruction for printing of the image displayed in the image display region, an image quality correction button, and a template button side by side along a width direction of the screen,
displaying the print button positioned on the center line among the plurality of buttons in a larger size than other buttons of the plurality of buttons,
in a case in which the image quality correction button is selected, displaying a slide bar for image editing and a reset button in a region between a region in which the plurality of buttons are displayed and the image display region, wherein the slide bar changes a parameter of the image in accordance with an amount of operation thereof and the reset button resets operation of the slide bar to a default position in accordance with selection thereof, in a case in which the template button is selected, displaying a plurality of selectable template images that can be applied to the image in the image display region, between the region in which the plurality of buttons are displayed and the image display region, wherein the selectable template images are displayed by scrolling, displaying the region between the region in which the plurality of buttons are displayed and the image display region in a radial pattern around a point set on the center line, and displaying a frame that surrounds the image displayed in the image display region and has a same margin as a printed article, wherein the function further comprises receiving a printing instruction in response to a swipe operation or a flick operation on the image displayed in the image display region or the frame, and only the selectable template images, or the slide bar and reset button, are displayed at any one time.

14. A non-transitory computer readable recording medium storing a display control program that causes a computer to realize a function of controlling a display of a touch panel that detects a touch operation on a screen, the function comprising:

displaying an image in an image display region set on a center line passing through a center of the screen, the center line extending in a vertical direction, displaying a plurality of buttons including a print button for providing an instruction for printing of the image displayed in the image display region, an image quality correction button, and a template button side by side along a width direction of the screen, displaying the print button positioned on the center line in a larger size than other buttons of the plurality of buttons, in a case in which the image quality correction button is selected, displaying a slide bar for image editing along a circle around a point set on the center line and a reset button in a region between a region in which the plurality of buttons are displayed and the image display region, wherein the slide bar changes a parameter of the image in accordance with an amount of operation thereof and the reset button resets operation of the slide bar to a default position in accordance with selection thereof, in a case in which the template button is selected, displaying a plurality of selectable template images that can be applied to the image in the image display region, between the region in which the plurality of buttons are displayed and the image display region, wherein the selectable template images are displayed by scrolling, and displaying a frame that surrounds the image displayed in the image display region and has a same margin as a printed article, wherein the function further comprises receiving a printing instruction in response to a swipe operation or a flick operation on the image displayed in the image display region or the frame, and only the selectable template images, or the slide bar and reset button, are displayed at any one time.

\* \* \* \* \*